(12) United States Patent
Sugimoto

(10) Patent No.: US 10,180,582 B2
(45) Date of Patent: Jan. 15, 2019

(54) INTEGRATED PRISM AND METHOD OF CONFIGURING INTEGRATED PRISM

(71) Applicant: NEC Corporation, Tokyo (JP)

(72) Inventor: Takara Sugimoto, Tokyo (JP)

(73) Assignee: NEC CORPORATION, Minato-ku, Tokyo (JP)

(*) Notice: Subject to any disclaimer, the term of this patent is extended or adjusted under 35 U.S.C. 154(b) by 0 days.

(21) Appl. No.: 15/547,896

(22) PCT Filed: Feb. 18, 2016

(86) PCT No.: PCT/JP2016/000877
§ 371 (c)(1),
(2) Date: Aug. 1, 2017

(87) PCT Pub. No.: WO2016/136217
PCT Pub. Date: Sep. 1, 2016

(65) Prior Publication Data
US 2018/0024374 A1    Jan. 25, 2018

(30) Foreign Application Priority Data
Feb. 25, 2015   (JP) ................ 2015-034808

(51) Int. Cl.
*G02B 5/04* (2006.01)
*G02B 27/28* (2006.01)
(Continued)

(52) U.S. Cl.
CPC ............ *G02B 27/286* (2013.01); *G02B 5/04* (2013.01); *G02B 5/3083* (2013.01);
(Continued)

(58) Field of Classification Search
CPC ... G02F 1/01; G02F 1/167; G02F 1/19; E06B 2009/2464; E06B 9/24
(Continued)

(56) References Cited

U.S. PATENT DOCUMENTS

| | | | |
|---|---|---|---|
| 2004/0252376 A1* | 12/2004 | Gollier | .................. G02B 27/28 359/489.07 |
| 2014/0071531 A1* | 3/2014 | Matiss | ................. G02B 27/283 359/489.09 |

FOREIGN PATENT DOCUMENTS

| | | |
|---|---|---|
| JP | 64-57214 A | 3/1989 |
| JP | 05-133800 A | 5/1993 |

(Continued)

OTHER PUBLICATIONS

International Search Report of PCT/JP2016/000877 dated May 24, 2016 [PCT/ISA/210].
(Continued)

*Primary Examiner* — Mohammed Hasan
(74) *Attorney, Agent, or Firm* — Sughrue Mion, PLLC

(57) ABSTRACT

In order to obtain an optical module which has few components and is simple to assemble and miniaturize, and a method of configuring same, an integrated prism is provided with: a polarization rotating unit which is formed on the external surface of the prism and converts the polarization of first input light into third light having a polarization perpendicular to the polarization of second input light; and a polarization multiplexing unit which is formed on the inner surface of the prism and multiplexes the polarizations of the second and third light to output fourth light including the second and third light.

16 Claims, 16 Drawing Sheets

(51) Int. Cl.
*G02F 1/01* (2006.01)
*H04J 14/00* (2006.01)
*H04J 14/04* (2006.01)
*H04J 14/06* (2006.01)
*G02B 27/14* (2006.01)
*G02B 5/30* (2006.01)

(52) U.S. Cl.
CPC ............. *G02B 27/144* (2013.01); *G02F 1/01* (2013.01); *H04J 14/00* (2013.01); *H04J 14/04* (2013.01); *H04J 14/06* (2013.01); *G02B 27/285* (2013.01); *G02F 2203/50* (2013.01)

(58) Field of Classification Search
USPC .......................................................... 359/238
See application file for complete search history.

(56) References Cited

FOREIGN PATENT DOCUMENTS

| | | |
|---|---|---|
| JP | 2003-505732 A | 2/2003 |
| JP | 2005-249966 A | 9/2005 |
| JP | 2011-028087 A | 2/2011 |
| JP | 2014-149398 A | 8/2014 |
| JP | 2015-169796 A | 9/2015 |
| WO | 2014/015043 A1 | 1/2014 |

OTHER PUBLICATIONS

Written Opinion of PCT/JP2016/000877 dated May 24, 2016 [PCT/ISA/237].

* cited by examiner

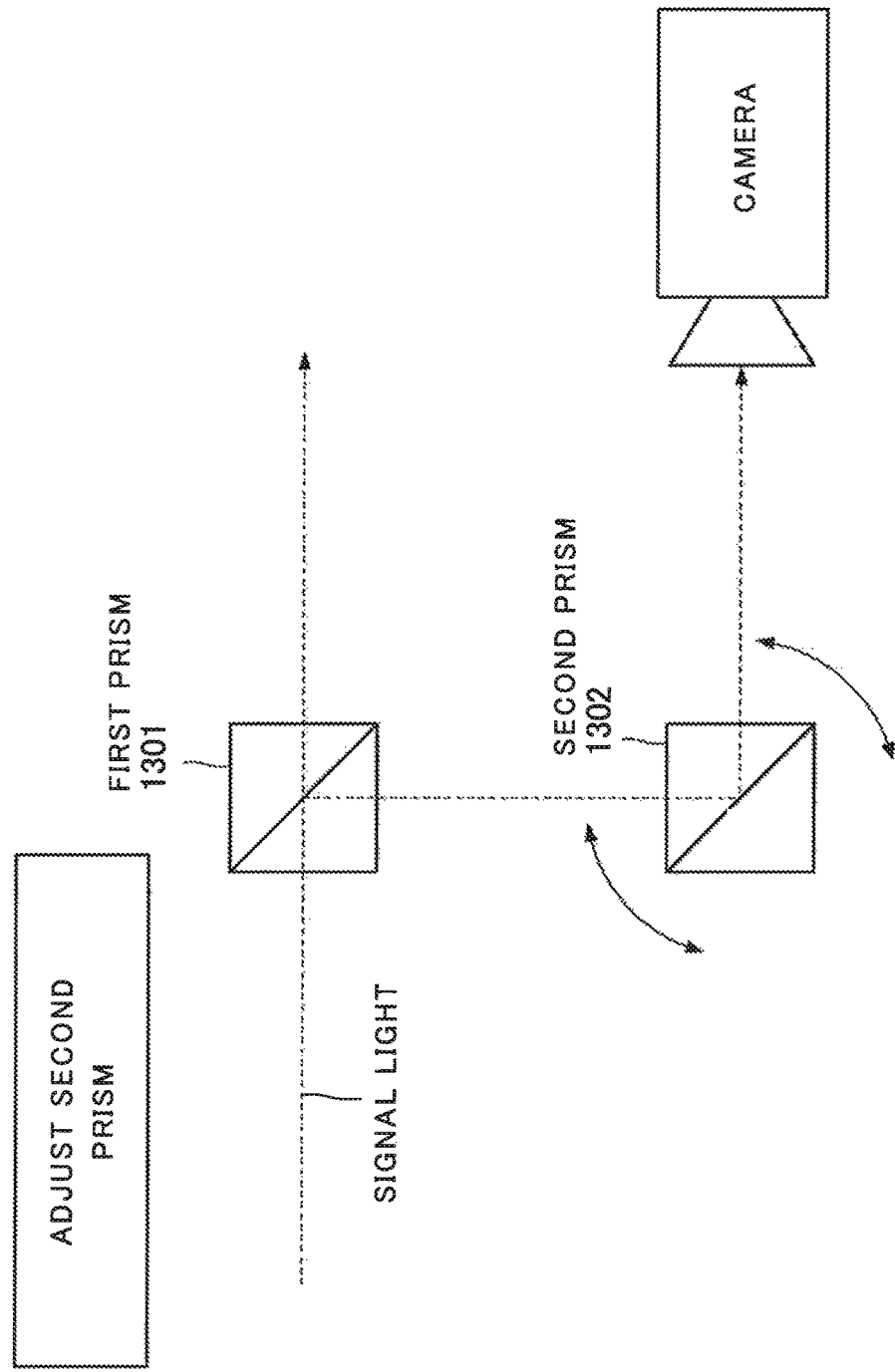

INTEGRATED PRISM AND METHOD OF CONFIGURING INTEGRATED PRISM

CROSS REFERENCE TO RELATED APPLICATIONS

This application is a National Stage of International Application No. PCT/JP2016/000877, filed Feb. 18, 2016, claiming priority based on Japanese Patent Application No. 2015-034808, filed Feb. 25, 2015, the contents of all of which are incorporated herein by reference in their entirety.

TECHNICAL FIELD

The present invention relates to an integrated prism and a method of configuring the integrated prism, and particularly, relates to an integrated prism for use in an optical transmitter having a plurality of integrated optical components, and a method of configuring the integrated prism.

BACKGROUND ART

Dual polarization-quadrature phase shift keying modulation (hereinafter, referred to as "DP-QPSK modulation".) is one of modulation schemes used in a multilevel phase modulation digital coherent transmission technique. Since it has high spectrum utilization efficiency, DP-QPSK modulation is widely employed as a modulation scheme for trunk communication.

FIG. 13 is a block diagram of a general optical transmitter 900 employing the DP-QPSK modulation. In FIG. 13, only components relevant to an optical system of the optical transmitter 900 are described.

A light source 901 is, for example, a semiconductor laser. Continuous light output from the light source 901 is branched into two rays by a spectroscope 902. The branched continuous light rays are phase-modulated by modulators 903 and 904, and become signal light rays. A polarization plane of the signal light ray output from the modulator 903 is 90 degrees rotated by a ½ wavelength plate (λ/2 plate) 905. The signal light ray emitted from the modulator 904 is transmitted through a delay plate 906 for matching a phase with the signal light ray passed through the ½ wavelength plate 905. Polarizations of these signal light rays are multiplexed by a polarization multiplexer 907. The multiplexed signal light transmitted through a spectroscope 913 is coupled to an optical fiber 908.

Parts of signal light rays are reflected by spectroscopes 911 to 913 and are coupled to monitor PDs (photo diodes, light-receiving elements) 921 to 923, in order to monitor optical intensities of the signal light rays. The spectroscopes 911 to 913 are prisms that include reflection films.

FIG. 14 is a diagram illustrating a specific arrangement of optical components constituting the optical system of the optical transmitter 900. The optical components including prisms and lenses used in the optical transmitter 900 constitute an optical module 990. The optical components described in FIG. 14 are all independent components, and are mounted individually.

In FIG. 13 and FIG. 14, elements having the same functions are assigned with the same reference numerals. Correspondence of the optical components described in FIG. 13 to the optical components described in FIG. 14 is as follows. The spectroscope 902 includes a 50% reflection prism 9021 and a 100% reflection prism 9022. The modulator 903 includes lenses 9031 and 9033, and a modulator 9032. The modulator 904 includes lenses 9041 and 9043, and a modulator 9042. 5% reflection prisms 931 to 933 correspond to the spectroscopes 911 to 913 in FIG. 13. The polarization multiplexer 907 in FIG. 13 includes a polarization multiplexer 9071 and a 100% reflection prism 9072 in FIG. 14. Light rays transmitted through the prisms are all collimated light rays, and the lenses 9031, 9033, 9041, and 9043 convert the collimated light rays in such a way as to be coupled to the modulators 9032 and 9042.

The 50% reflection prism 9021 receives continuous light input from the light source 901 in FIG. 13. The continuous light is branched into two rays by the 50% reflection prism 9021, and the branched continuous light rays are subjected to phase modulation by the modulators 9032 and 9042. The 5% reflection prisms 931 and 932 reflect 5% of optical power of the respective signal light rays modulated by the modulators 9032 and 9042, and guide the reflected signal light rays to the monitor PDs 921 and 922. The polarization multiplexer 9071 couples the signal light rays transmitted through the 5% reflection prisms 931 and 932, and generates polarization-multiplexed light. The 5% reflection prism 933 reflects 5% of optical power of the polarization-multiplexed signal light, and guides the reflected polarization-multiplexed signal light to the monitor PD 923. The 100% reflection prisms 9022 and 9072 are used for changing a direction of light. The polarization-multiplexed light transmitted through the 5% reflection prism 933 is coupled to the optical fiber 908 in FIG. 13.

In relation to the present invention, each of PTL 1 and PTL 2 discloses a configuration of an optical module that includes an optical filter and a prism.

CITATION LIST

Patent Literature

[PTL 1] Japanese Unexamined Patent Application Publication No. 2005-249966 (paragraph [0037])

[PTL 2] Japanese Unexamined Patent Application Publication No. H01-057214 (page 2)

SUMMARY OF INVENTION

Technical Problem

As illustrated in FIG. 14, the optical module 990 is implemented by micro-optics using a large number of optical components. In order to reduce an excessive loss in an optical system employing the micro-optics, it is required to precisely match optical axes of individual optical components with each other. For example, when the 50% reflection prism 9021 and the 100% reflection prism 9022 are respectively mounted, optical axis misalignment due to angular misalignment between the both components largely influences an optical loss of the optical module 990.

FIG. 15 and FIG. 16 are diagrams for describing a procedure of adjusting an optical axis of a prism. In FIG. 15 and FIG. 16, optical axis adjustment of an optical system having a first prism 1301 and a second prism 1302 is described. Referring to FIG. 15, first, an optical axis of the first prism 1301 is adjusted by using a camera capable of detecting a wavelength of signal light. After a position of the first prism 1301 is fixed, an optical axis of the second prism 1302 is adjusted by observing reflection light of the first prism 1301 and the second prism 1302 by using the camera, as illustrated in FIG. 16. This procedure is applied to, for example, adjustment of the 50% reflection prism 9021 and the 100% reflection prism 9022 illustrated in FIG. 14.

As described in FIG. 15 and FIG. 16, when the optical components constituting the optical module 990 are assembled, it is required to repeat precise optical axis adjustment for each of the optical components. Thus, complicated optical axis adjustment required for the optical module 990 is a cause of decrease in yield and increase in cost of the optical module 990.

In addition, the optical module 990 has a problem that increasing mounting density of optical components to be equipped is difficult in order to prevent physical or optical interference between the optical components when a large number of optical components are mounted. Although lenses and prisms individually have small dimensions, a clearance space for a manipulator to be used in assembly is necessary for each of the components. This makes it difficult to miniaturize the optical module 990. Then, neither PTL 1 nor PTL 2 discloses a technique for solving a problem of implementing an optical module that has a fewer number of components and is easy to assemble and miniaturize.

OBJECT OF INVENTION

An object of the present invention is to provide a technique for implementing an optical module that has a fewer number of components and is easy to assemble and miniaturize.

Solution to Problem

An integrated prism according to the present invention includes: a polarization rotating part that is formed on an external surface of a prism and converts a polarization of input first light into third light having a polarization perpendicular to a polarization of input second light; and a polarization multiplexing part that is formed on an internal surface of the prism, multiplexes a polarization of the second light and the third light, and outputs the polarization as fourth light including the second light and the third light.

A method of configuring an integrated prism according to the present invention includes: forming, on an external surface of a prism, a polarization rotating part that converts a polarization of input first light into third light having a polarization perpendicular to a polarization of input second light; and forming, on an internal surface of the prism, a polarization multiplexing part that multiplexes a polarization of the second light and the third light and outputs the polarization as fourth light including the second light and the third light.

Advantageous Effects of Invention

An integrated prism and a method of configuring the integrated prism according to the present invention implement an optical module that has a fewer number of components and is easy to assemble and miniaturize.

BRIEF DESCRIPTION OF DRAWINGS

FIG. 16 is a diagram for describing a procedure of adjusting a prism.

DESCRIPTION OF EMBODIMENTS

Figure 1:
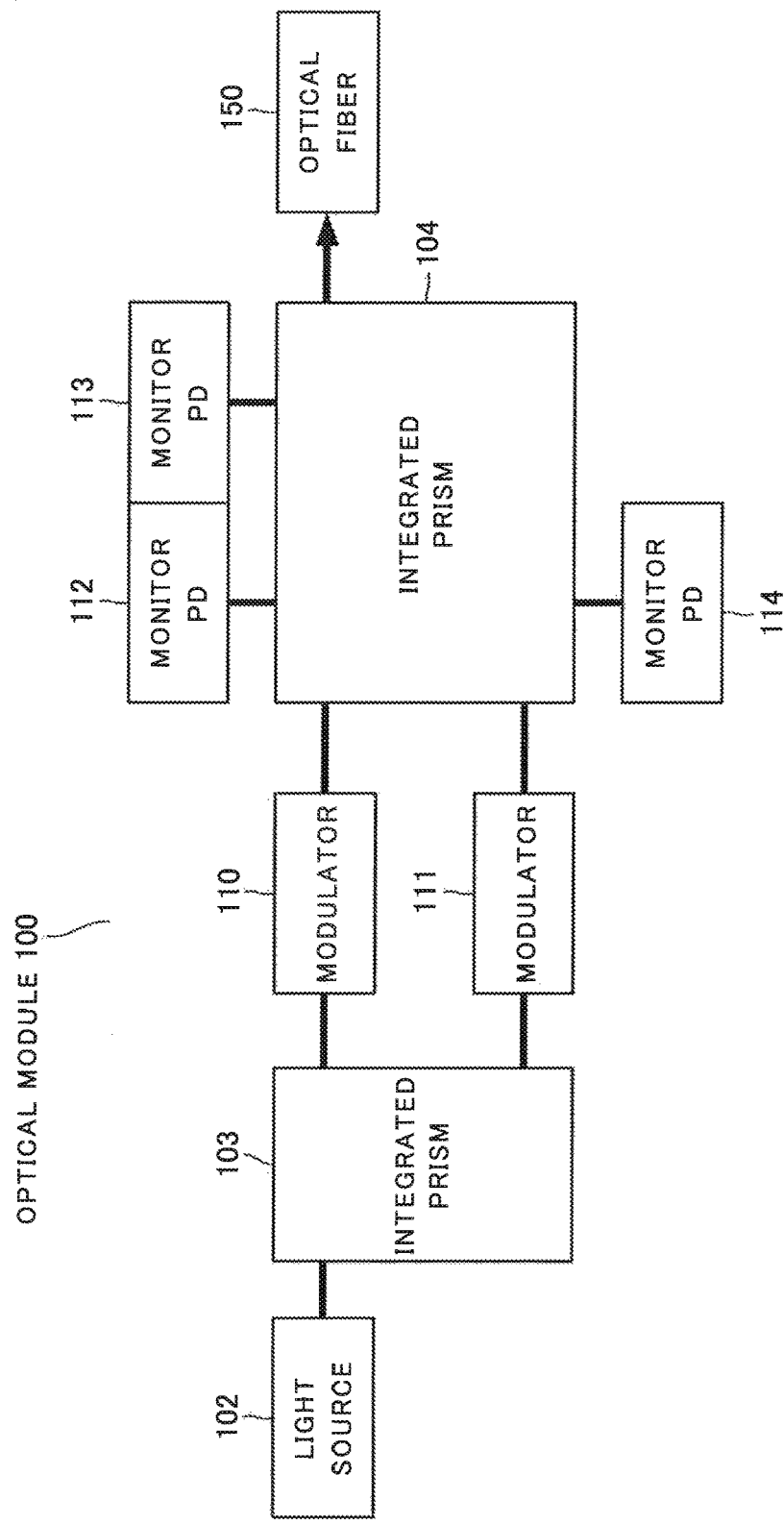
FIG. 1 is a block diagram illustrating a configuration of an optical module 100 according to a first example embodiment.

A first example embodiment of the present invention will be described with reference to the drawings. FIG. 1 is a block diagram illustrating a configuration of an optical module 100 according to the first example embodiment of the present invention. The optical module 100 includes a light source 102, integrated prisms 103 and 104, modulators 110 and 111, and monitor PDs 112 to 114. The optical module 100 modulates continuous light output from the light source 102 by using the modulators 110 and 111, generates signal light, and outputs the generated signal light to an optical fiber 150. The light source 102 and the optical fiber 150 may not be included in the optical module 100. A more specific configuration of the optical module 100 will be described below. Note that an arrow assigned to a signal in each drawing of FIG. 1 and thereafter indicates an example of a direction of the signal, but does not limit a direction of the signal.

Figure 2:
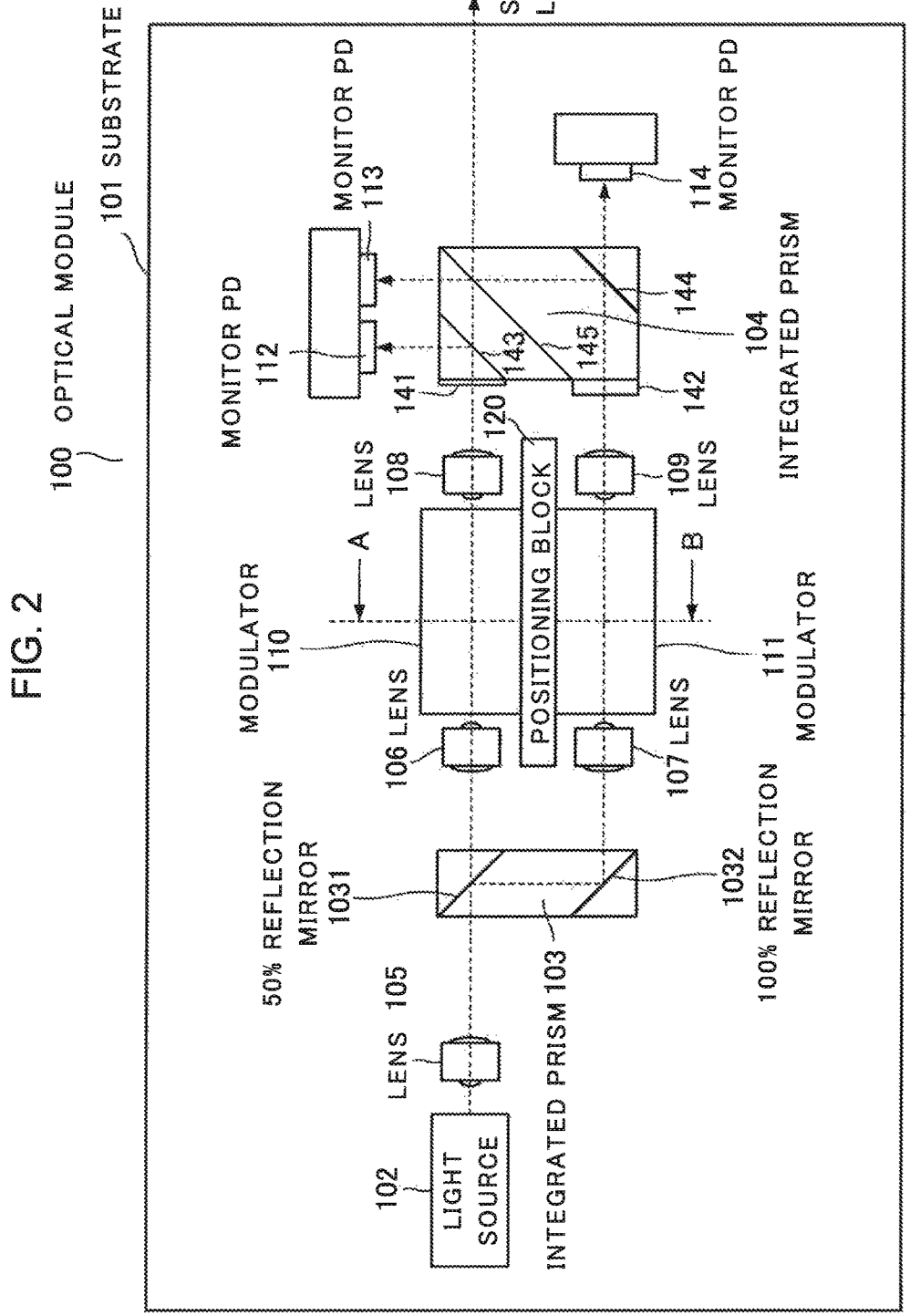
FIG. 2 is a schematic diagram illustrating a specific configuration of the optical module 100.
Figure 3:
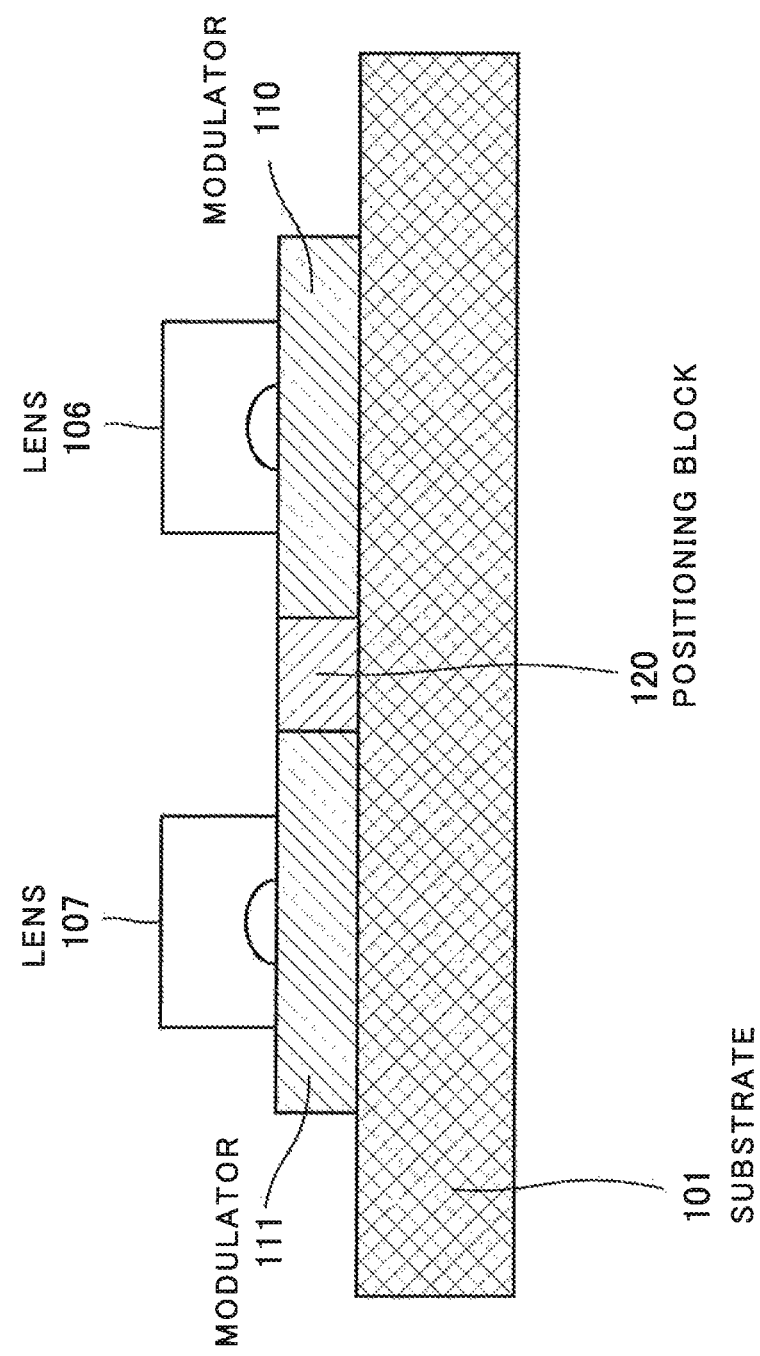
FIG. 3 is a sectional view taken along section A-B in the optical module 100.

FIG. 2 is a schematic diagram illustrating a specific configuration of the optical module 100. FIG. 3 is a sectional view taken along section A-B in FIG. 2 of the optical module 100. In each drawing hereafter, the same elements as the already-described elements are assigned with the same reference numerals, and description therefor is omitted.

Optical components including the integrated prisms 103 and 104 are arranged on a substrate 101 of the optical module 100. The substrate 101 is a substrate on which optical components are mounted. On the substrate 101, a marker indicating a position where an optical component is equipped, electric wiring for the modulators 110 and 111, and a positioning block 120 are formed in advance at a time of manufacture. However, FIG. 2 does not illustrate the marker and the electric wiring. For the substrate 101, a ceramic substrate, which is excellent in a high-frequency characteristic and processing accuracy, can be used. The light source 102, the integrated prisms 103 and 104, lenses 105 to 109, the modulators 110 and 111, and the monitor PDs 112 to 114 are mounted on the substrate 101.

The lenses 105 to 109 are lenses formed of a glass that is transparent for a wavelength band of signal light. The lenses 105 to 109 may be aspheric lenses. The lenses 105 to 109 are used for efficiently propagating light transmitted through the respective optical components.

An optical axis of light propagating inside the optical module 100 is indicated with a dashed line in FIG. 2. A positional relationship of the optical components will be described in detail along with the optical axis. The light source 102 is, for example, a variable-wavelength laser. The lens 105 mounted immediately behind the light source 102 converts output light into collimated light. The collimated light is parallel light having a diameter of around 500 μm.

The integrated prism 103 is mounted, by using a marker, on an optical axis of continuous light emitted from the lens 105. For a material of the integrated prism 103, quartz that is transparent for a wavelength of the continuous light can be used. On incident and emission surfaces of the integrated prisms 103 and 104, antireflection films are formed. On reflection surfaces inside the integrated prisms 103 and 104, mirrors having predetermined reflectance (for example, 5%, 50%, and 100%) are formed. A mirror having a reflectance of approximately 100% is also called a total reflection mirror. A mirror having a reflectance of less than 100% is also called a semitransparent mirror. The mirrors are, for example, dielectric multilayer films.

The integrated prism 103 includes a 50% reflection mirror 1031 having a transmissivity and a reflectance of 50%, and a 100% reflection mirror 1032 having a reflectance of 100%. The 50% reflection mirror 1031 and the 100% reflection mirror 1032 are formed on surfaces of prisms in such a way as to be used with an angle of 45 degrees formed with respect to incident light from the lens 105. The integrated prism 103 is assembled by bonding together the prisms on which the 50% reflection mirror 1031 and the 100% reflection mirror 1032 are formed. A configuration of the integrated prism 104 will be described later using FIG. 4.

The lenses 106 and 107 are arranged in order to couple collimated light emitted from the integrated prism 103 to the modulators 110 and 111. The lens 106 and the lens 107 are components that are the same as the lens 105, and are arranged facing opposite from the lens 105. The modulators 110 and 111 modulate continuous light and generate signal light. As the modulators 110 and 111, an indium phosphide (InP) optical modulator that is compact and is excellent in characteristics can be used.

The modulators 110 and 111 are mounted on the substrate 101 by being butted against the positioning block 120 formed on the substrate 101 in advance, as illustrated in FIG. 3. A distance between continuous light input parts of the modulators 110 and 111 mounted on the substrate 101 is equal to a distance between two rays of collimated light emitted from the integrated prism 103.

The lenses 108 and 109 are arranged behind the modulators 110 and 111 (in other words, on an emission side of signal light). The lenses 108 and 109 convert signal light emitted from the modulators 110 and 111 into collimated light. By using the same components for the lenses 108 and 109 as those of the lens 105 to 107, mix-up of lenses can be avoided. When an excessive loss is allowed, adjustment of optical axes of the lenses 105 to 109 in a direction perpendicular to a surface of the substrate 101 may be omitted, by arranging casings of the lenses 105 to 109 in such a way as to be in contact with the substrate 101.

Figure 4:
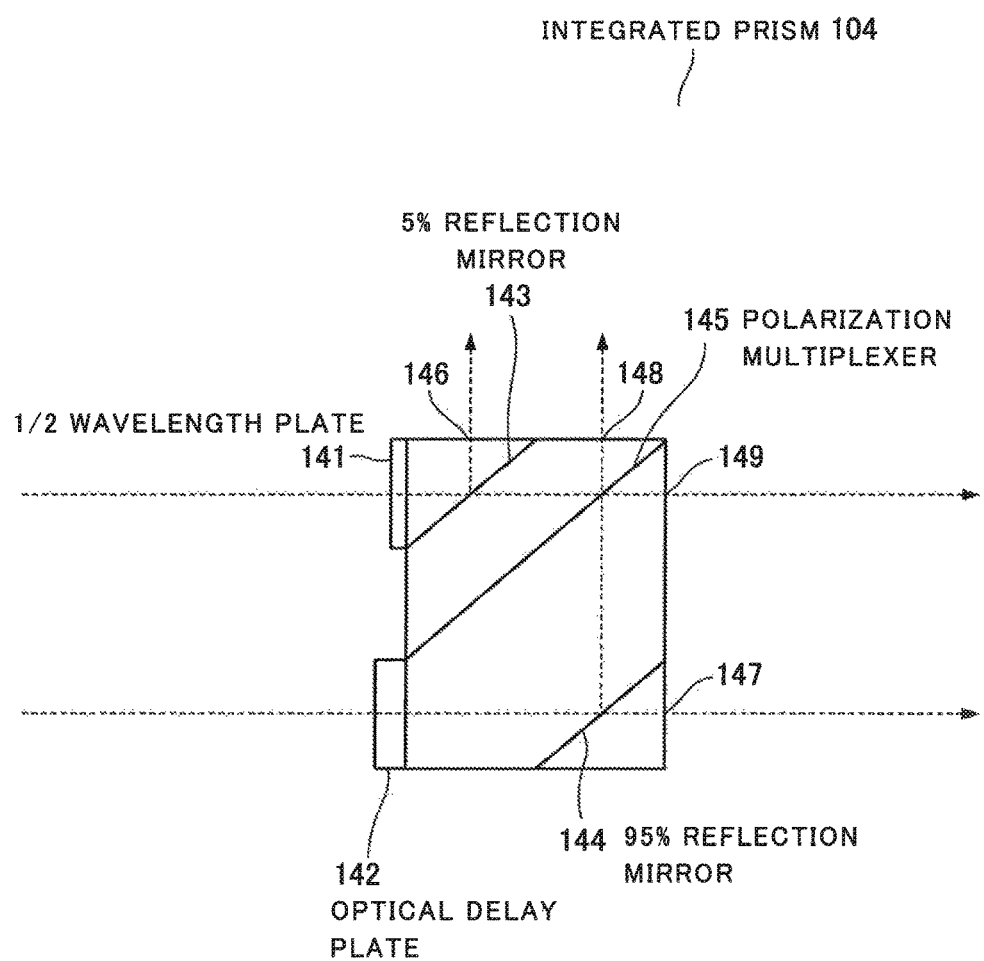
FIG. 4 is a diagram illustrating a configuration of an integrated prism 104.

In FIG. 2, the integrated prism 104 is arranged behind the lenses 108 and 109. FIG. 4 is a diagram illustrating a configuration of the integrated prism 104. The integrated prism 104 is an optical component that includes a ½ wavelength plate 141, an optical delay plate 142, a 5% reflection mirror 143, a 95% reflection mirror 144, and a polarization multiplexer 145 integrated as one body by using prisms. The polarization multiplexer 145 transmits 5% and reflects 95% of input transverse electric (TE) light, and reflects 5% and transmits 95% of input transverse magnetic (TM) light. As the 5% reflection mirror 143, the 95% reflection mirror 144, and the polarization multiplexer 145 included in the integrated prism 104, dielectric multilayer films may be used.

Signal light is incident perpendicularly on the ½ wavelength plate 141 and the optical delay plate 142. The 5% reflection mirror 143, the 95% reflection mirror 144, and the polarization multiplexer 145 are formed on surfaces of prisms in such a way as to be used with an angle of 45 degrees formed with respect to collimated light incident from the lenses 108 and 109. The integrated prism 104 is assembled by bonding together the prisms on the surfaces of which these reflection mirrors and the polarization multiplexer 145 are formed, the ½ wavelength plate 141, and the optical delay plate 142. A distance between optical axes of signal light incident on the ½ wavelength plate 141 and the optical delay plate 142 is equal to a distance between two rays of continuous light emitted from the integrated prism 103, and a distance between optical axes of signal light emitted from the modulators 110 and 111.

There are four emission parts where signal light is emitted from the integrated prism 104. In FIG. 4, a first emission part 146 is a monitor output of output optical power of the modulator 110, and a second emission part 147 is a monitor output of output optical power of the modulator 111. A third emission part 148 is a monitor output of optical power of polarization-multiplexed signal light, and a fourth emission part 149 is an output of polarization-multiplexed signal light. As illustrated in FIG. 2, the monitor PDs 112, 114, and 113 are arranged on three locations of the monitor outputs, in other words, on optical axes of the first to third emission parts 146, 147, and 148, and are able to independently measure the respective optical powers. A lens for coupling signal light to the optical fiber 150 may be mounted on an optical axis of the fourth emission part 149.

Figure 5:
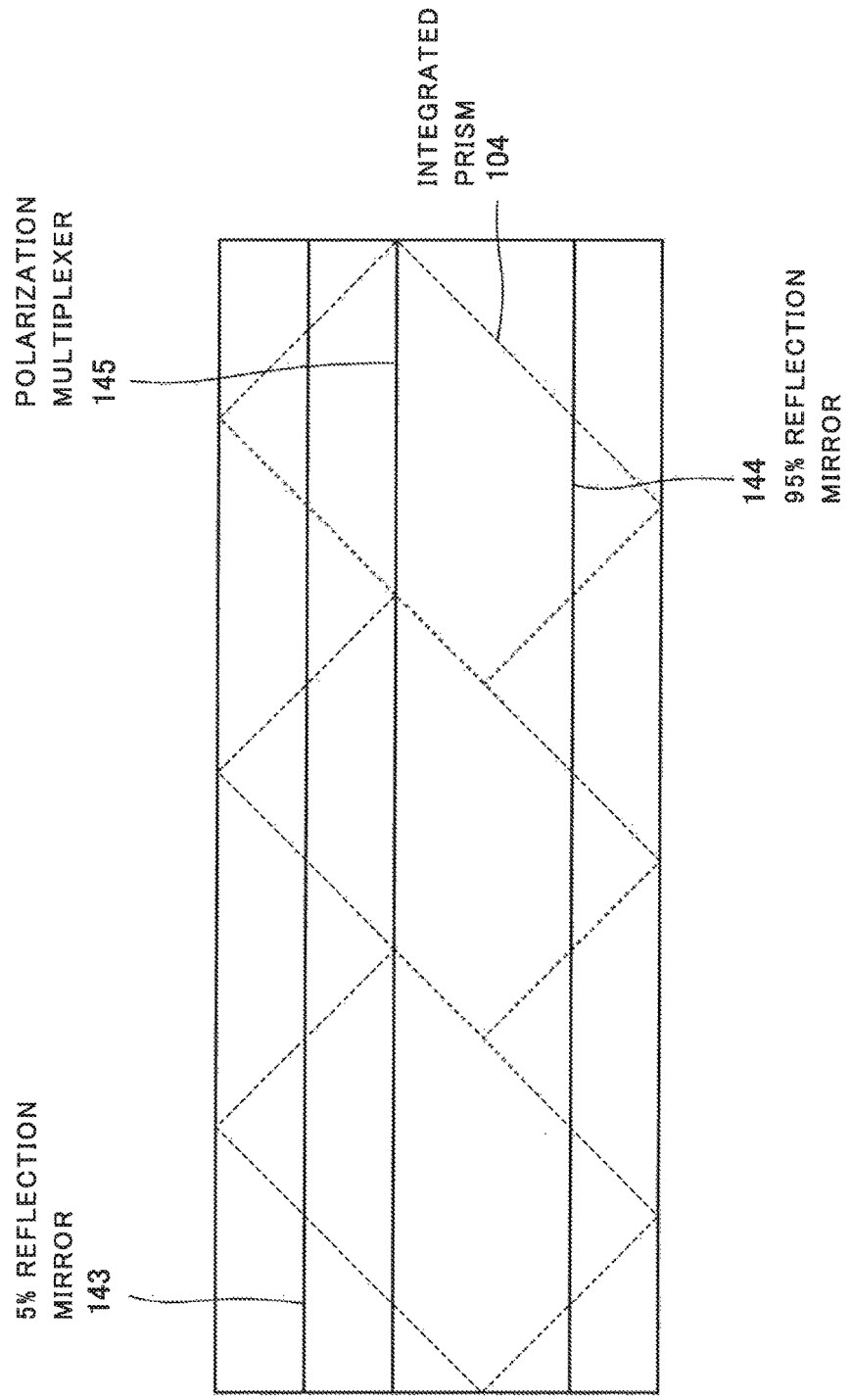
FIG. 5 is a diagram for describing an example of a method of manufacturing the integrated prism 104.

FIG. 5 is a diagram for describing an example of a method of manufacturing the integrated prism 104. As illustrated in FIG. 5, the integrated prism 104 is manufactured from a glass material having inserted therein the 5% reflection mirror 143, the 95% reflection mirror 144, and the polarization multiplexer 145 illustrated in FIG. 4. The integrated prism 104 is easily manufactured in accordance with a procedure substantially similar to that of a general prism without requiring special processing, by cutting a laminated glass material along dashed lines illustrated in FIG. 5.

Next, a procedure of manufacturing the optical module 100 will be described with reference to FIG. 2. First, the light source 102 is equipped on the substrate 101 in accordance with a marker (not illustrated) on the substrate 101. At this time, it is desirable that a position of an optical axis of the light source 102 matches with a design position of an optical axis. However, the position of the optical axis of the light source 102 can be adjusted by the lens 105 to be mounted later. Thus, it is sufficient that the light source 102 can be mounted with an accuracy of around 100 μm or less of deviation from a design value. In general, an assembling device for use in mounting of optical components for such an optical module has a mounting accuracy of 1 μm or less. Accordingly, the light source 102 can be mounted with satisfactory accuracy.

Subsequently, the lens 105 is mounted. The lens 105 converts continuous light output by the light source 102 into collimated light. When an optical axis of the lens 105 is adjusted, a camera (for example, an infrared camera) capable of detecting emission light from the light source 102 is arranged on the optical axis. A position of the lens 105 with respect to the light source 102 is determined by adjusting the lens to such a position that does not change a position of the continuous light and a beam diameter of the collimated light even when the camera is moved in an optical axis direction. Thereafter, the lens 105 is bonded and fixed on the substrate 101 by an ultraviolet curing resin or the like.

Figure 6:
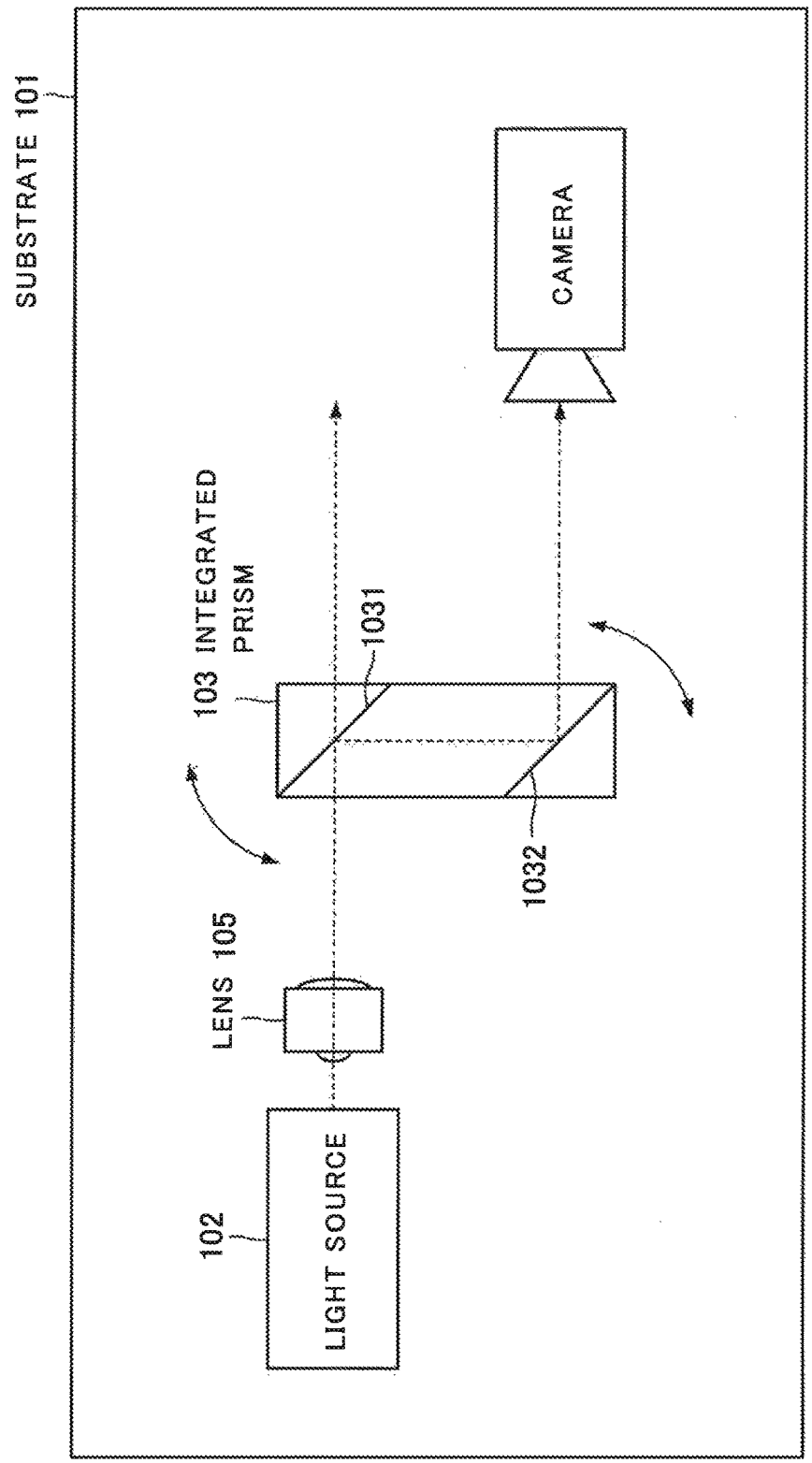
FIG. 6 is a diagram for describing a method of adjusting a mounting position of an integrated prism 103.

Next, mounting of the integrated prism 103 will be described. FIG. 6 is a diagram for describing a method of adjusting a mounting position of the integrated prism 103. First, the integrated prism 103 is positioned aligned with a marker formed on the substrate 101. Since light emitted from the lens 105 is collimated light, an excessive loss in optical power of continuous light does not increase largely even when the position of the integrated prism 103 is slightly shifted in the left-and-right direction of FIG. 6. However, when the position of the integrated prism 103 is largely shifted in the up-and-down direction of FIG. 6, "shading" occurs in collimated light, which may possibly cause an excessive loss in optical power of signal light. In addition, when the integrated prism 103 is mounted rotated with respect to a designed position, an excessive loss occurs in coupling between the integrated prism 103 and the modulators 110 and 111 due to angular misalignment.

Thus, as illustrated in FIG. 6, a mounting position of the integrated prism 103 is adjusted by observing emission light from the integrated prism 103 by using a camera capable of detecting emission light. First, positioning of the integrated prism 103 in a rotation direction is performed. Specifically, the position of the integrated prism 103 is adjusted in such a way that a spot position of the emission light from the integrated prism 103 does not change even when the camera is moved in a direction parallel with the emission light. Accordingly, an angle (rotation direction) of the integrated prism 103 is determined accurately.

Figure 7:
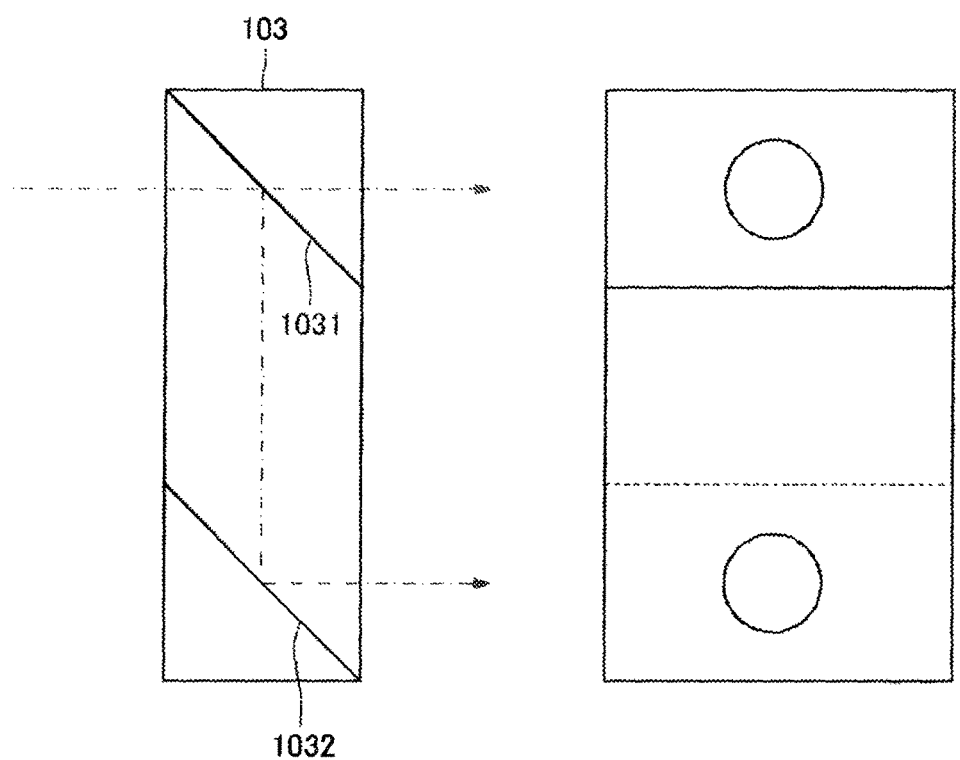
FIG. 7 is a diagram for describing a way when a position of collimated light of the integrated prism 103 is monitored with a camera.
Figure 8:
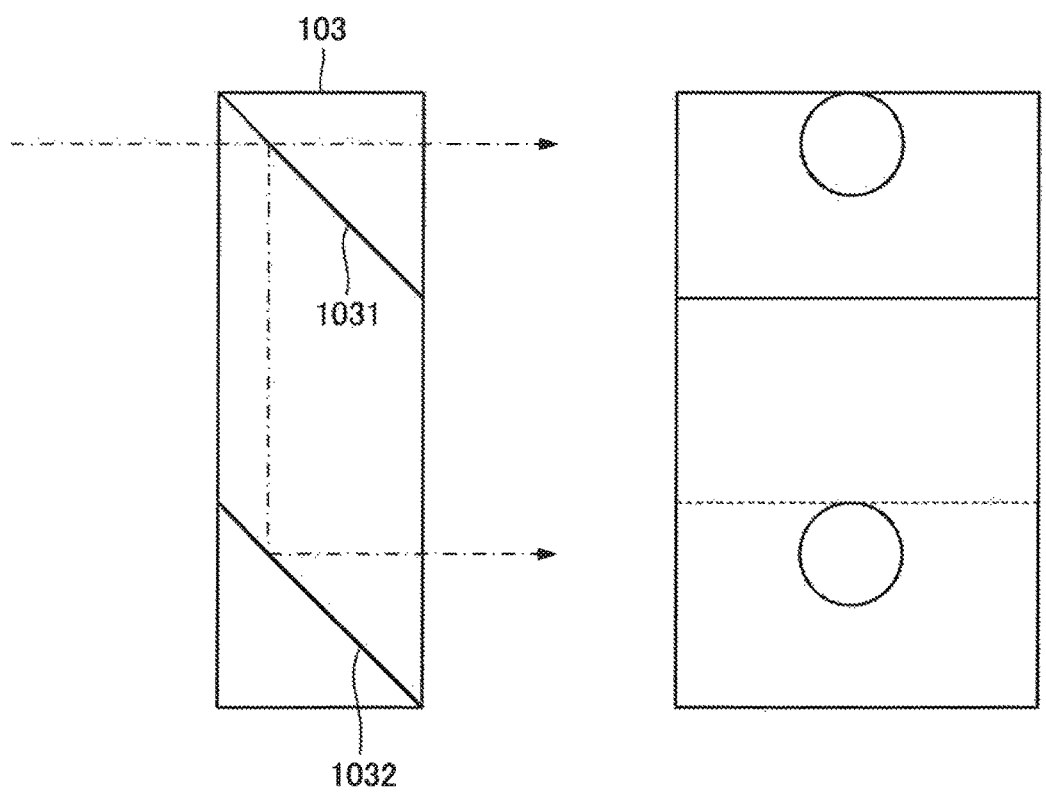
FIG. 8 is a diagram for describing a way when a position of collimated light of the integrated prism 103 is monitored with a camera.

Next, positioning of the integrated prism 103 in the up-and-down direction of FIG. 6 is performed. FIG. 7 and FIG. 8 are diagrams for describing a way of monitoring a position of collimated light emitted from the integrated prism 103 with a camera. The left side of FIG. 7 and FIG. 8 illustrates top views of the integrated prism 103, and optical axes of collimated light are indicated with arrowed dot-and-dash lines. On the right side of FIG. 7 and FIG. 8, cross sections of collimated light when the integrated prism 103 is observed with a camera from an output side are indicated schematically with circles. A position of the integrated prism 103 in the up-and-down direction of the drawing is adjusted in such a way that collimated light is incident on centers of reflection films sandwiched between prisms, as illustrated in FIG. 7.

FIG. 8 illustrates a case in which the integrated prism 103 is located below a correct position in the drawing. The 50% reflection mirror 1031 and the 100% reflection mirror 1032 are positioned in parallel with each other. Thus, when positional misalignment of the integrated prism 103 occurs in the up-and-down direction of the drawing in comparison with FIG. 7, two rays of collimated light to be emitted are moved in an identical direction as illustrated in FIG. 8.

Accordingly, it is sufficient that position adjustment of the integrated prism 103 is performed for only one of the two rays of collimated light to be emitted from the integrated prism 103. With this adjustment, positions of the optical axes in the up-and-down direction of FIG. 7 can be adjusted accurately in such a way that deviation from a design value becomes 50 μm or less.

Next, the modulators 110 and 111 are mounted butted against the positioning block 120 equipped on the substrate 101 in advance. Thus, the modulators 110 and 111 are mounted at predetermined positions without requiring precise optical axis adjustment.

Since optical axis adjustment using the lenses 106 to 109 is performed, optical axis adjustment of the modulators 110 and 111 does not require high accuracy in positions of optical modulators in the left-and-right direction of the drawing. However, positional misalignment of the modulators 110 and 111 in the up-and-down direction of the drawing may influence an excessive loss in optical power of continuous light incident on the modulators 110 and 111. In addition, angular misalignment of the modulators 110 and 111 within a range of numerical aperture (NA) of the modulators 110 and 111 does not largely increase an excessive loss in optical power. Then, when positional misalignment in the up-and-down direction of the drawing is absent between an incident point of continuous light and an emission point of a signal or the like in each of the modulators 110 and 111, no angular misalignment of the modulators 110 and 111 occurs.

Accordingly, in order to reduce an excessive loss due to the positional misalignment and the angular misalignment of the modulators 110 and 111, it is important to prevent the positional misalignment of the modulators 110 and 111 in the up-and-down direction of the drawing. In the present example embodiment, mounting accuracy of the modulators 110 and 111 in the up-and-down direction of the drawing has satisfactory accuracy by means of the positioning block 120. Thus, the positional misalignment of the integrated prism 103 is a main factor of optical axis misalignment in front of the modulators 110 and 111 (on an incident side of continuous light). However, mounting accuracy of the integrated prism 103 is around 50 μm as described above, and further, a positional misalignment of the integrated prism 103 of around 100 μm can be corrected in a next lens mounting process. Thus, in the present example embodiment, the integrated prism 103 and the modulators 110 and 111 are coupled with optically low loss.

After the modulators 110 and 111 are mounted, the lenses 106 to 109 in front of and behind the modulators 110 and 111 are mounted. First, the lenses 106 and 107 on an incident side of the modulators 110 and 111 are mounted. The lenses 106 and 107 are adjusted to positions where optical power of continuous light from the light source 102 is most strongly coupled to the modulators 110 and 111. Thus, when optical axes of the lenses 106 and 107 are adjusted, optical power of light emitted from the modulators 110 and 111 may be measured by temporarily-arranged PDs on an output side of the modulators 110 and 111. Alternatively, when the modulators 110 and 111 have functions of monitoring optical power in a waveguide, the functions may be used. The lenses 106 and 107 are bonded and fixed at positions having the highest coupling efficiency with respect to the modulators 110 and 111 by an ultraviolet curing resin, for example.

Optical axis misalignment between continuous light emitted from the integrated prism 103 and the modulators 110 and 111 is corrected by adjusting the positions of the lenses 106 and 107. When optical axis misalignment between continuous light emitted from the integrated prism 103 and the modulators 110 and 111 is around 100 μm or less, continuous light from the light source 102 can be coupled to the modulators 110 and 111 in a state where an excessive loss is satisfactorily low.

The lenses 108 and 109 convert signal light output from the modulators 110 and 111 into collimated light, and make respective rays of the collimated light incident on the ½ wavelength plate 141 and the optical delay plate 142 included in the integrated prism 104. The lenses 108 and 109 are positioned by monitoring collimated light by using a camera in accordance with a procedure similar to that of the lens 105 immediately behind the light source 102, and are bonded and fixed on the substrate 101 by an ultraviolet curing resin.

Figure 9:
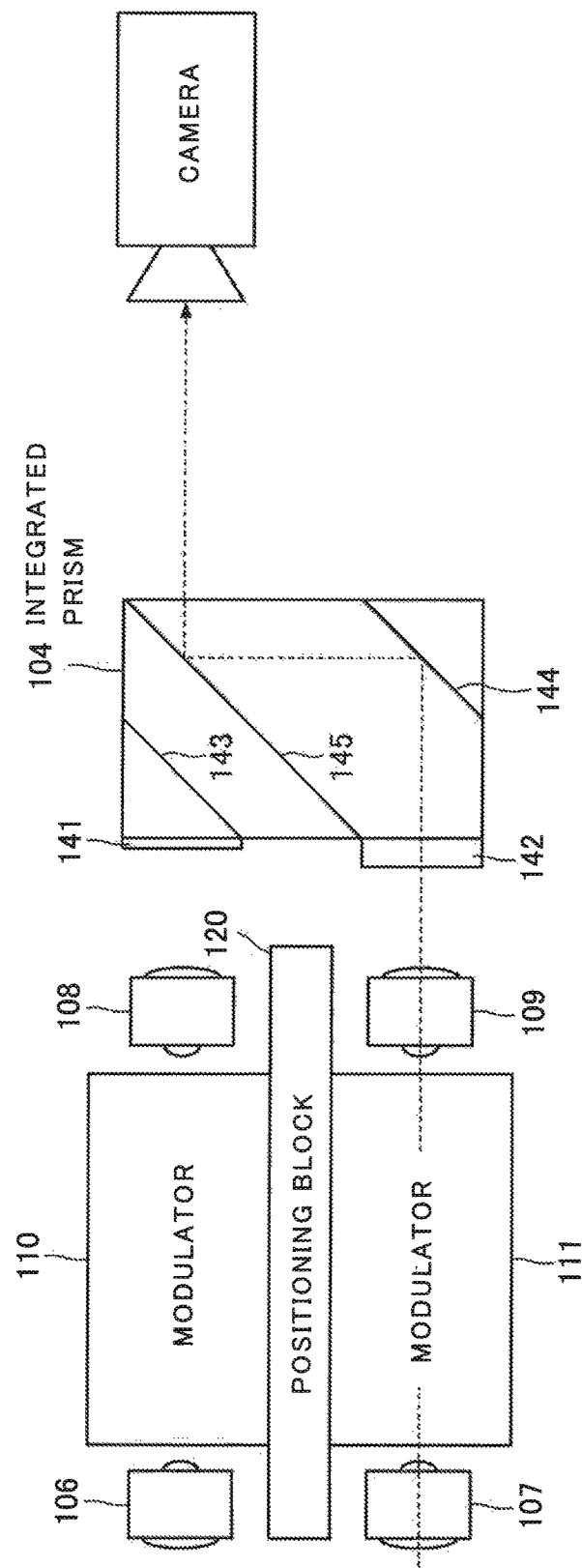
FIG. 9 is a diagram for describing a method of adjusting an optical axis of the integrated prism 104.

Subsequently, a method of adjusting the integrated prism 104 will be described. FIG. 9 is a diagram for describing a method of adjusting an optical axis of the integrated prism 104. Emission light from the modulator 111 is transmitted through the optical delay plate 142, and thereafter is reflected by the 95% reflection mirror 144 and the polarization multiplexer 145. As a result, an optical axis of the emission light of the modulator 111 is parallel-translated. On the other hand, emission light of the modulator 110, which is slightly parallel-translated according to the Snell's law in the integrated prism 104, does not move much substantially. In view of this, as illustrated in FIG. 9, angular adjustment of the integrated prism 104 can be performed by causing only the modulator 111 to emit signal light and monitoring the signal light with an infrared camera. A relative positional relationship between two rays of collimated light incident on the integrated prism 104 can be considered to be the same as that between two rays of collimated light emitted from the integrated prism 103 illustrated in FIG. 7 and FIG. 8. Thus, in-plane optical axis adjustment of the integrated prism 104 is also possible by monitoring collimated light by using a camera, similarly to the optical axis adjustment of the integrated prism 103.

Note that a diameter of collimated light generated by the lenses 108 and 109 is satisfactorily large relative to light receiving diameters of the monitor PDs 112 to 114. Thus, mounting positions of the monitor PDs 112 to 114 do not require high accuracy. Accordingly, mounting of the monitor PDs 112 to 114 is relatively easy.

Figure 10:
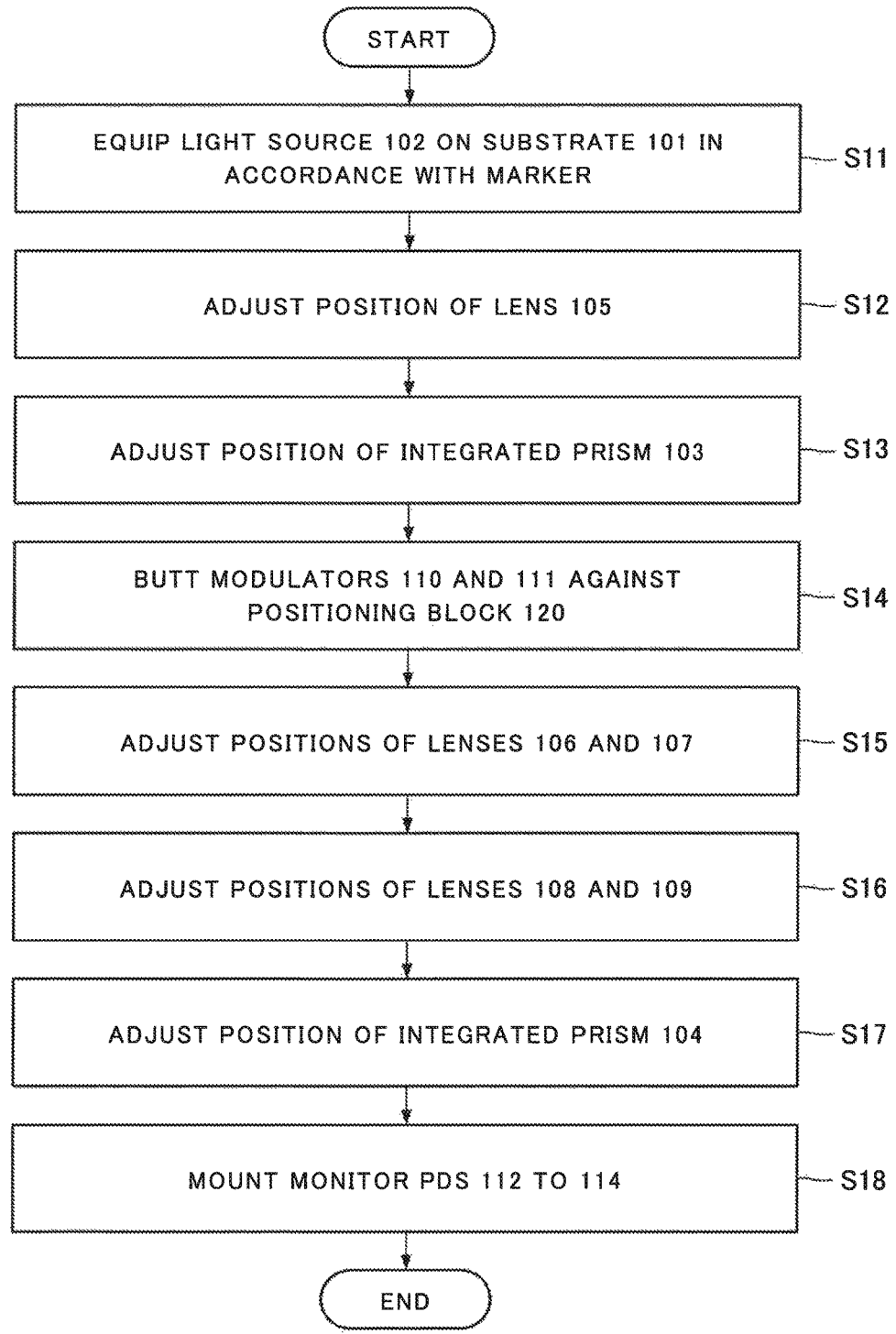
FIG. 10 is an example of a flowchart illustrating a procedure of assembling the optical module 100.

FIG. 10 is an example of a flowchart illustrating a procedure of assembling the optical module 100 according to the present example embodiment described above. At Step S11 in FIG. 10, the light source 102 is equipped on the substrate 101 in accordance with a marker on the substrate 101. At Step S12, a position of the lens 105 is adjusted by using a camera. At Step S13, a position of the integrated prism 103 is adjusted by using a camera. At Step S14, the modulators 110 and 111 are butted against the positioning block 120. At Step S15, positions of the lenses 106 and 107 are adjusted by monitoring intensity of incident light on the modulators 110 and 111. At Step S16, positions of the lenses 108 and 109 are adjusted by using a camera. At Step S17, a position of the integrated prism 104 is adjusted by using a camera. At Step S18, the monitor PDs 112 to 114 are mounted.

The optical module 100 configured on the substrate 101 in this way is housed in a casing. The integrated prism 104 outputs polarization-multiplexed signal light. By connecting the polarization-multiplexed signal light to the optical fiber 150 in such a way as to be coupled thereto, the optical module 100 can be incorporated into an optical communication device using DP-QPSK modulation.

(Function of Optical Module)

A function of the optical module 100 according to the first example embodiment will be described with reference to FIG. 2. Continuous light emitted from the light source 102 is converted into collimated light by the lens 105, and is incident on the integrated prism 103. The 50% reflection mirror 1031 and the 100% reflection mirror 1032 included in the integrated prism 103 form an angle of 45 degrees with respect to the collimated light generated by the lens 105. By using the 50% reflection mirror 1031 and the 100% reflection mirror 1032 in combination, the collimated light generated by the lens 105 is branched into two parallel rays of collimated light having approximately equal optical powers. The branched two rays of collimated light are concentrated by the lenses 106 and 107, and are respectively coupled to the modulators 110 and 111. The modulators 110 and 111 are driven by an electric signal from a not-illustrated driver circuit that is mounted outside the optical module 100. The modulators 110 and 111 perform phase modulation on continuous light incident from the lenses 106 and 107, and generate two rays of signal light. The modulators 110 and 111 may perform QPSK modulation on continuous light by using respectively different electric signals. However, a modulation scheme of the modulators 110 and 111 is not limited to the QPSK. The rays of signal light generated by the modulators 110 and 111 are respectively converted into collimated light again by the lenses 108 and 109, and are output to the integrated prism 104.

A polarization of signal light emitted from the modulator 110 is 90 degrees rotated by the ½ wavelength plate 141 included in the integrated prism 104. The light source 102 outputs continuous light in a transverse electric (TE) mode. Thus, signal light in the TE mode incident on the ½ wavelength plate 141 is made into signal light in a transverse magnetic (TM) mode by polarization rotation. The signal light made into the TM mode has 5% of optical power emitted by the 5% reflection mirror 143 from the first emission part 146 to be coupled to the monitor PD 112, and has 95% of optical power transmitted through the 5% reflection mirror 143 to be incident on the polarization multiplexer 145.

On the other hand, signal light emitted from the modulator 111 is subjected to adjustment of a delay amount by the optical delay plate 142 included in the integrated prism 104. The delay amount of the optical delay plate 142 is set in such a way that a phase of the signal light emitted from the modulator 110 matches with a phase of the signal light emitted from the modulator 111 on an output of the polarization multiplexer 145. The phase-adjusted signal light has 5% of optical power emitted by the 95% reflection mirror 144 from the second emission part 147 to be coupled to the monitor PD 114, and has 95% of optical power reaching the polarization multiplexer 145.

The polarization multiplexer 145 transmits 95% and reflects 5% of optical power in the TM mode. In addition, the polarization multiplexer 145 transmits 5% and reflects 95% of optical power in the TE mode. Accordingly, in the polarization multiplexer 145, 95% of optical power of signal light in the TM mode transmitted through the ½ wavelength plate 141 is multiplexed with 95% of optical power of signal light in the TE mode transmitted through the optical delay plate 142. The multiplexed light is output from the fourth emission part 149 to outside the optical module 100. This light is coupled to an optical fiber. Since the phase of the signal light in the TE mode is adjusted by the optical delay plate 142, the phase of the signal light in the TE mode matches with the phase of the signal light in the TM mode.

In addition, 5% of optical power of the signal light multiplexed by the polarization multiplexer 145 is output from the third emission part 148 to the monitor PD 113, in order to monitor optical power of the multiplexed signal light. In this way, the optical module 100 can generate DP-QPSK-modulated signal light.

As described above, the optical module 100 according to the first example embodiment is able to significantly reduce procedures necessary for optical axis adjustment, by unifying prisms arranged in front of the modulators 110 and 111 and prisms arranged behind the modulators 110 and 111, respectively. On an input side of the modulators 110 and 111, optical axis adjustment of two rays of collimated light branched by a prism can be carried out simultaneously by adjusting only the one integrated prism 103. On an output side of the modulators 110 and 111, similarly, optical axis adjustment of two rays of collimated light obtained by converting signal light emitted from the modulators 110 and 111 can be carried out simultaneously by adjusting the one integrated prism 104. As a result, the number of processes for assembling an optical module is significantly reduced. Further, the number of components constituting the optical module 100 can be reduced by integrating optical components as the integrated prisms 103 and 104. Therefore, a clearance necessary in mounting of optical components can be reduced, which achieves miniaturization of an optical module.

In other words, the optical module 100 according to the first example embodiment exhibits an advantageous effect of being easy to assemble. The reason is that, while optical axis adjustment is required for each of a large number of prisms in a general optical module, the optical module 100 is able to shorten a process of optical axis adjustment through optical axis adjustment on an integrated prism basis.

In addition, the optical module 100 also exhibits an advantageous effect of simplifying a production facility by using one camera for optical axis adjustment without changing a direction, since only an optical axis in one direction needs adjustment.

Further, the optical module 100 according to the first example embodiment exhibits an advantageous effect of having a fewer number of components and also being easy to miniaturize.

The reason is that an integrated prism having integrated therein reflection mirrors and a polarization multiplexer is used as an optical component. Then, by using the integrated prisms 103 and 104, a problem in mounting a plurality of optical components is reduced, such as ensuring a clearance for an assembling device and a clearance at a time of optical axis adjustment, or concerning about leakage of adhesive at a time of prism fixing. For example, the optical module 100 according to the first example embodiment also enables a distance between optical components to be close to around a diameter of collimated light.

Modification Example of First Example Embodiment

The advantageous effects of having a fewer number of components and being easy to assemble and miniaturize in the first example embodiment can also be obtained by a modification example of the optical module 100 according to the first example embodiment described below. With reference to FIG. 1 and FIG. 2, a description is given indicating reference numerals of elements relevant to the modification example of the optical module 100 within parentheses. The modification example of the optical module includes a branching part (103), optical modulators (110 and 111), and an integrated prism (104).

The branching part (103) includes a semitransparent mirror (1031) and a total reflection mirror (1032). The semitransparent mirror (1031) branches input light at a predetermined ratio, and outputs one ray of the branched input light. The total reflection mirror (1032) is arranged in such a way that another ray of the input light branched by the semitransparent mirror (1031) is output in parallel with the one input light ray output from the semitransparent mirror (1031). The total reflection mirror (1032) reflects substantially all of incident light rays.

The optical modulators (110 and 111) respectively modulate the one input light ray and the other input light ray incident from the branching part (103), and generate and output first light and second light.

The integrated prism (104) includes a polarization rotating part (141) and a polarization multiplexing part (145). The polarization rotating part (141) converts a polarization of the first light corresponding to the one input light ray into third light having a polarization perpendicular to a polarization of the second light corresponding to the another input light ray. The polarization rotating part (141) is formed on an external surface of a prism. The polarization multiplexing part (145) polarization-multiplexes the second light and the third light, and outputs the polarization-multiplexed light as fourth light. The polarization multiplexing part (145) is formed on a bonding surface of the prism (in other words, on an internal surface of the prism).

In the optical module including such a configuration, a process of optical axis adjustment is shortened through optical axis adjustment using a branching part and an integrated prism as a basis. In addition, the above-described modification example of the optical module 100 reduces a problem in mounting a plurality of optical components and prisms, by using the branching part and the integrated prism having integrated therein reflection mirrors and a polarization multiplexer. As a result, the above-described modification example of the optical module 100 exhibits advantageous effects of having a fewer number of components and being easy to assemble and miniaturize.

Second Example Embodiment

Figure 11:
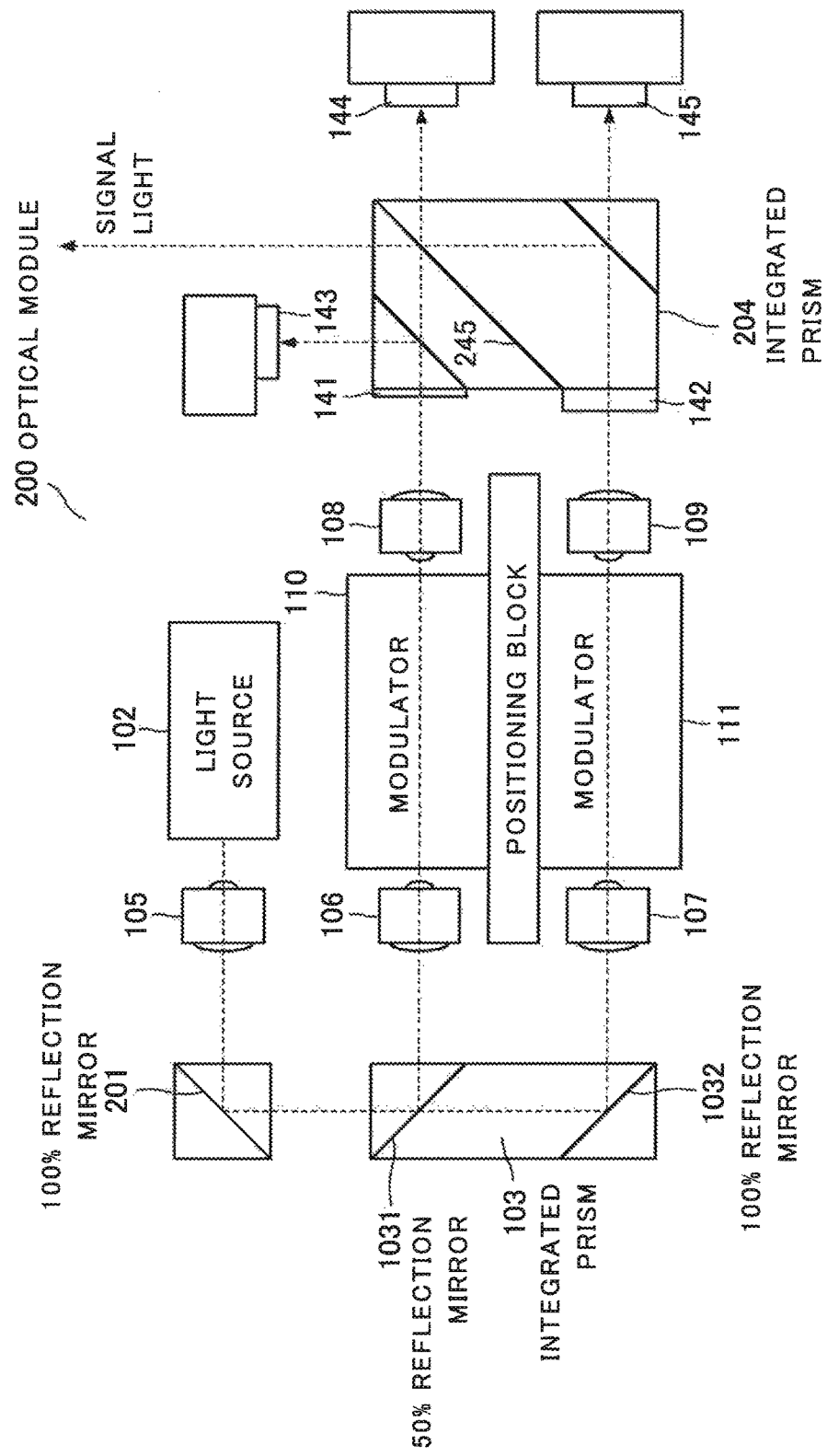
FIG. 11 is a schematic diagram illustrating a configuration of an optical module 200 according to a second example embodiment.

FIG. 11 is a schematic diagram illustrating a configuration of an optical module 200 according to a second example embodiment of the present invention. A difference between the optical module 200 and the optical module 100 according to the first example embodiment is in that the optical module 200 includes a 100% reflection mirror 201, and an integrated prism 204 instead of the integrated prism 104. The integrated prism 204 includes the same configuration as that of the integrated prism 104, except that a specification of a polarization multiplexer 245 is different. Configurations other than the above of the optical module 200 are the same as those of the optical module 100. In FIG. 10, the same elements as those in FIG. 2 are assigned with the same reference numerals, and description therefor will be omitted.

FIG. 11 illustrates a configuration in which an optical axis of emission light from the light source 102 is not on the same axis as an optical axis of light passed through the modulator 110. In the optical module 200 illustrated in FIG. 11, continuous light emitted from the light source 102 is reflected by the 100% reflection mirror 201, and is incident on the integrated prism 103 from a direction different from that in FIG. 2. In addition, the polarization multiplexer 245 used in the integrated prism 204 according to the present example embodiment transmits 95% and reflects 5% of optical power in the TE mode. In addition, the polarization multiplexer 245 transmits 5% and reflects 95% of optical power in the TM mode. As a result, unlike the optical module 100, the optical module 200 outputs 95% of optical power of signal light upwardly of the drawing.

The optical module 200 according to the second example embodiment including such a configuration exhibits an advantageous effect of being easy to assemble and miniaturize, similarly to the optical module 100 according to the first example embodiment. Further, the optical module 200 enables reduction of a size of the optical module 200 in a direction parallel with optical axes of the modulators 110 and 111 (the lateral direction of FIG. 11), by changing optical paths of continuous light and signal light.

In addition, even when the polarization multiplexer 145 having the same specification as that of the optical module according to the first example embodiment is used instead of the polarization multiplexer 245, and positions of the ½ wavelength plate 141 and the optical delay plate 142 are switched, the integrated prism 204 is able to perform the same operation.

Third Example Embodiment

Figure 12:
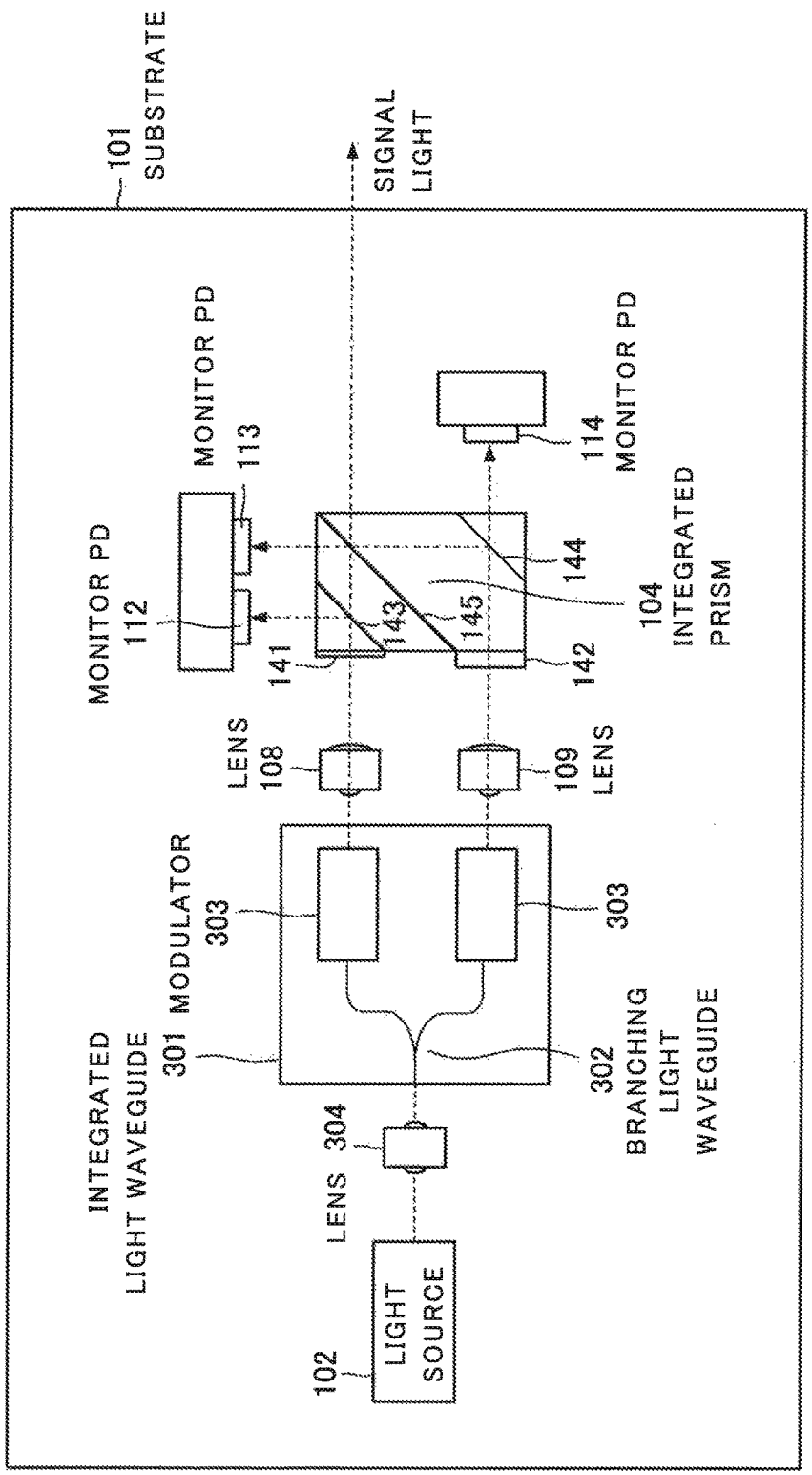
FIG. 12 is a schematic diagram illustrating a configuration of an optical module 300 according to a third example embodiment.
Figure 13:
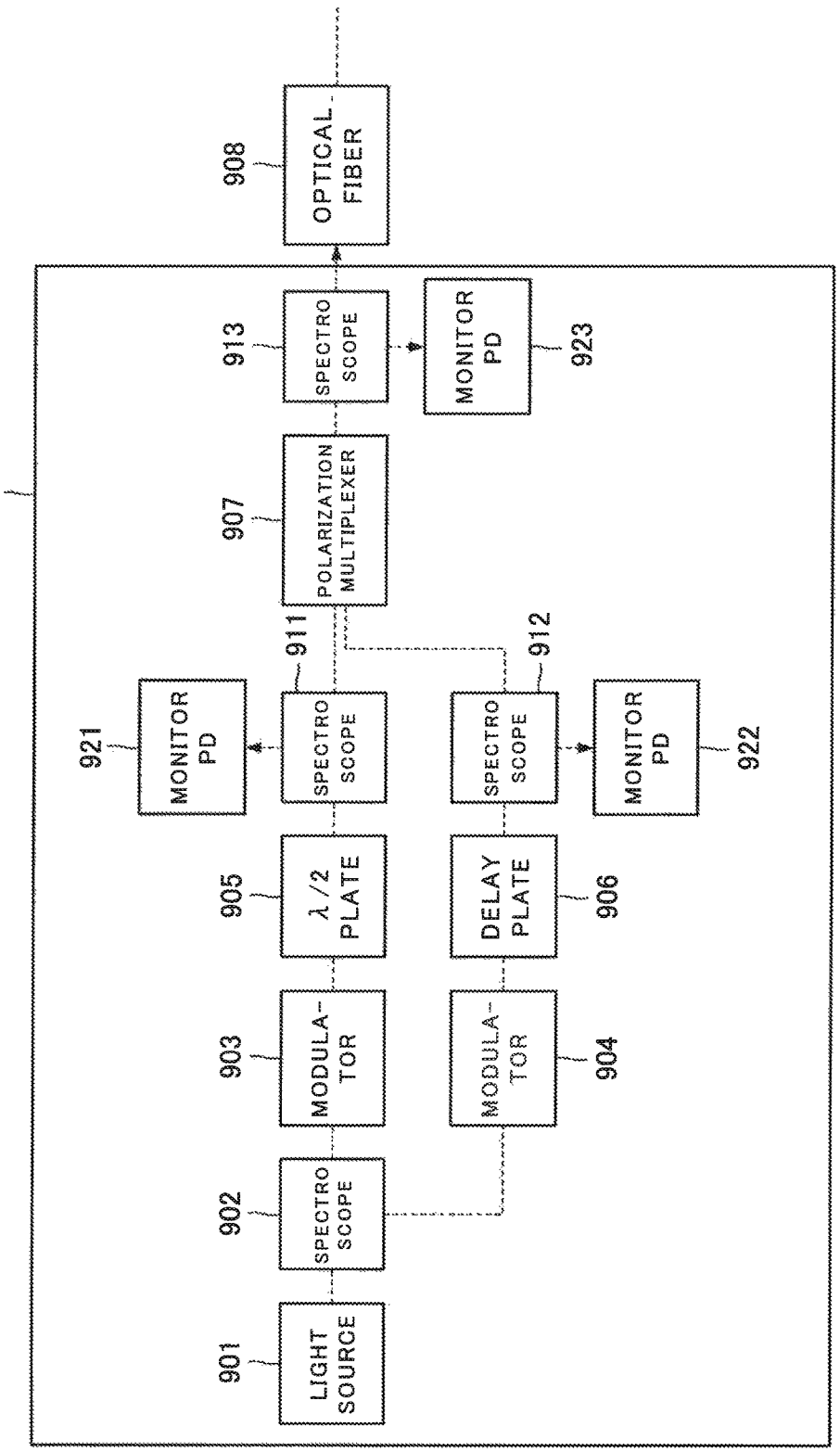
FIG. 13 is a block diagram of a general optical transmitter employing DP-QPSK modulation.
Figure 14:
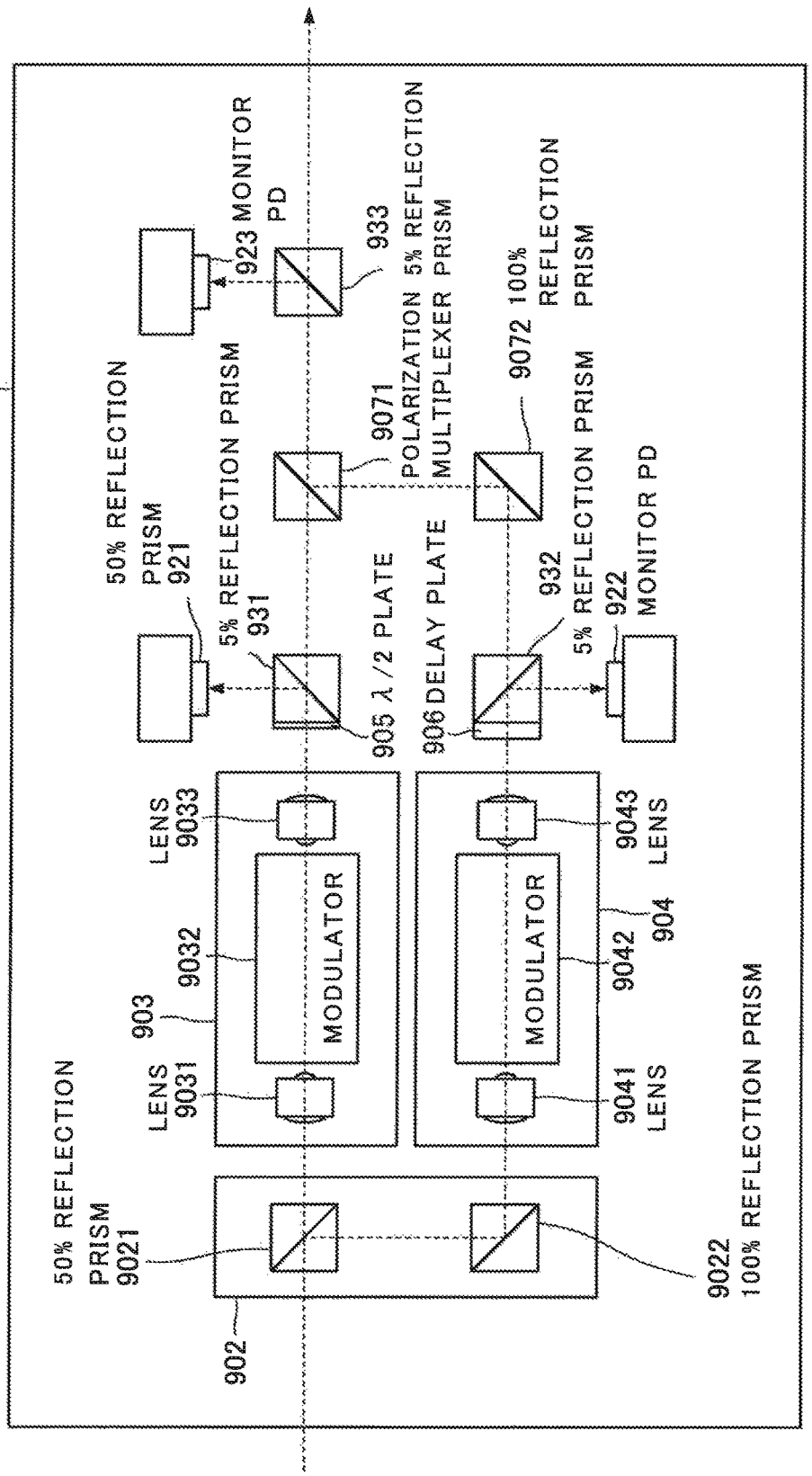
FIG. 14 is a diagram illustrating a specific arrangement of optical components constituting an optical system of the optical transmitter 900.
Figure 15:
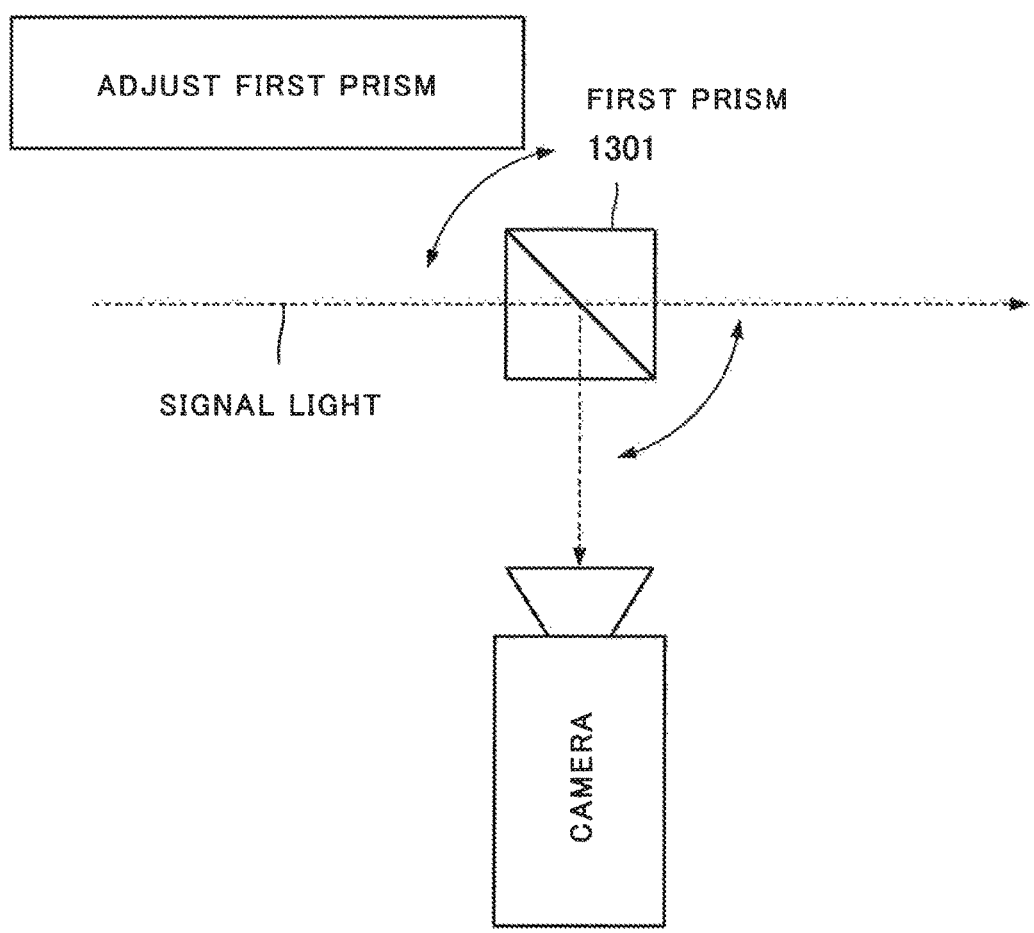
FIG. 15 is a diagram for describing a procedure of adjusting a prism.

FIG. 12 is a schematic diagram illustrating a configuration of an optical module 300 according to a third example embodiment of the present invention. A difference between the optical module 300 and the optical module 100 according to the first example embodiment illustrated in FIG. 2 is in that functions equivalent to the integrated prism 103 and the modulators 110 and 111 are implemented by a one-chip integrated light waveguide 301. In FIG. 12, common elements with those of the optical module 100 according to the first example embodiment are assigned with the same reference numerals and names, and description therefor will be omitted.

The integrated light waveguide 301 includes a branching light waveguide 302 and modulators 303. A lens 304 couples continuous light emitted from the light source 102 to the branching light waveguide 302. Optical axis adjustment of the lens 304 is performed for maximizing and equalizing optical powers emitted from the respective modulators 303 on an output side. The branching light waveguide 302 branches input continuous light into two rays at a predetermined ratio (for example, an optical power ratio of 1:1). The two rays of light branched by the branching light waveguide 302 are input to the modulators 303. The modulators 303 are two optical modulators arranged in parallel. For a material of the modulators 303, for example, InP is used. However, a material of the integrated light waveguide 301 including the branching light waveguide 302 is not limited. The modulators 303 respectively independently modulate the light rays branched by the branching light waveguide 302, and output the modulated light rays to the integrated prism 104. A modulation scheme of the modulators 303 is, for example, QPSK, but is not limited thereto.

The optical module 300 including such a configuration has the branching light waveguide 302 and the modulators 303 formed into one body as the one-chip integrated light waveguide 301. Thus, the optical module 300 eliminates necessity of optical axis adjustment of the integrated prism 103 and the lenses 106 and 107 in the optical module 100 according to the first example embodiment.

Additionally, the optical module 300 further shortens a process of optical axis adjustment, in comparison with the optical module 100 according to the first example embodiment. The reason is that the branching light waveguide 302 that branches continuous light is integrated with the modulators 303. In addition, the optical module 300 also reduces a problem in mounting a plurality of optical components similarly to the first and second example embodiments, by integrating optical components. As a result, the optical module 300 also exhibits an advantageous effect of having a fewer number of components and easiness of optical module assembly and miniaturization.

Note that a positioning block for positioning the integrated light waveguide 301 in the up-and-down direction of the drawing may be provided on the substrate 101. In addition, when the light source 102 is integrated with the integrated light waveguide 301 as well, further shortening of a process of optical axis adjustment and further miniaturization of the optical module 300 are possible. Further, the optical module 300 may include the integrated prism 204 described in the second example embodiment, instead of the integrated prism 104.

Fourth Example Embodiment

A minimum configuration of a second integrated prism will be described as a fourth example embodiment. Corresponding reference numerals in FIG. 4 are indicated within parentheses. The second integrated prism of minimum configuration includes a polarization rotating part (141) and a polarization multiplexing part (145). The polarization rotating part (141) converts a polarization of input first light into third light having a polarization perpendicular to a polarization of input second light. The polarization multiplexing part (145) polarization-multiplexes the second light and the third light, and outputs the polarization-multiplexed light as fourth light including the second light and the third light. The polarization rotating part (141) is formed on an external surface of a prism. The polarization multiplexing part (145) is formed on an internal surface of the prism.

The above-described polarization rotating part and the polarization multiplexing part correspond to the ½ wavelength plate 141 and the polarization multiplexer 145 in FIG. 4, respectively. Such an integrated prism of minimum configuration including only the ½ wavelength plate 141 and the polarization multiplexer 145 also reduces a problem in mounting optical components, by forming optical components into one body. In other words, the integrated prism including only the ½ wavelength plate 141 and the polarization multiplexer 145 illustrated in FIG. 4 is also able to obtain an advantageous effect of achieving an optical module having a fewer number of components and being easy to assemble and miniaturize.

Other Modification Examples of Example Embodiments

The following is a modification example that is applicable in accordance with a configuration of an optical module or an integrated prism of each of the example embodiments.

The number of the modulators 110, 111, and 303 may be three or more. In this case, reflectance of a reflection mirror of an integrated prism, the number of branches of a branching light waveguide, or the like need be adjusted in accordance with the number of modulators. Equipping three or more modulators enables coexistence of signal light rays having different modulation schemes.

The light source 102 may not be mounted on the substrate 101. Separating the light source 102 from the substrate 101 can avoid an influence of heat generated from the light source 102 on the modulators 110, 111, and 303.

The light source 102 may be connected with the integrated prism 103 by means of an optical fiber that includes a lens at an end thereof. The lens connected at the end of the optical fiber outputs collimated continuous light. Optical components on the substrate 101 are assembled in advance by using another light source, and are connected with the light source 102 by means of the optical fiber when being equipped on a package. In the present modification example, since the light source 102 and other optical components can be assembled independently from each other, overall yield of the optical modules 100 and 200 including a light source is improved.

Further, the light source 102 may be arranged outside the optical module 100, 200, or 300, and a semiconductor optical amplifier may be mounted on the substrate 101, instead of the light source 102. Mounting the semiconductor optical amplifier can lower an output of the light source 102.

In each of the example embodiments, transmissivity or reflectance of a reflection mirror or a polarization multiplexer is exemplified as 5%, 50%, 95%, and 100%. However, transmissivity or reflectance of a reflection mirror or a polarization multiplexer may not accurately match with these values, when being allowed for operation of an optical module according to each of the example embodiments. In addition, an incident angle of collimated light on a reflection mirror and a polarization multiplexer may not be accurately 45 degrees as well, when an excessive loss in optical power is allowed. Further, a dimension and a mounting position of each optical component may have an error in a range in which an excessive loss can fall within an allowable range through optical axis adjustment.

Note that the example embodiments of the present invention can be described as the following supplementary notes, but are not limited to the following.

(Supplementary Note 1)

An integrated prism including:

a polarization rotating unit that is formed on an external surface of a prism and converts a polarization of input first light into third light having a polarization perpendicular to a polarization of input second light; and a polarization multiplexing unit that is formed on an internal surface of the prism, multiplexes a polarization of the second light and the third light, and outputs the polarization as fourth light including the second light and the third light.

(Supplementary Note 2)

The integrated prism according to supplementary note 1, wherein the integrated prism includes, on an internal surface of the prism, a first branching unit, a second branching unit, and a third branching unit that respectively branch and output part of the second light, part of the third light, and part of the fourth light, and one ray of the light branched by the first branching unit, one ray of the light branched by the second branching unit, and one ray of the light branched by the third branching unit are input to respectively different light-receiving elements.

(Supplementary Note 3)

The integrated prism according to supplementary note 2, wherein the polarization multiplexing unit forms an angle of approximately 45 degrees with respect to the second light and the third light, the first branching unit is a semitransparent mirror that forms an angle of approximately 45° with respect to the second light, the second branching unit is a semitransparent mirror that forms an angle of approximately 45 degrees with respect to the third light, the third branching unit is a semitransparent mirror that forms an angle of approximately 45 degrees with respect to the fourth light, and the first branching unit, the second branching unit, and the third branching unit are formed on respectively different surfaces of the prism constituting the integrated prism.

(Supplementary Note 4)

The integrated prism according to supplementary note 3, wherein the polarization multiplexing unit is caused to function as the third branching unit, by setting reflectance and transmissivity of the polarization multiplexing unit for each polarization to a predetermined value.

(Supplementary Note 5)

The integrated prism according to any one of supplementary notes 1 to 4, wherein an optical delay unit that sets a delay amount of the second light in such a way that a phase of the second light matches with a phase of the third light in the fourth light is included on an external surface of the prism.

(Supplementary Note 6)

An optical module including:

a fourth branching unit that branches input light at a predetermined ratio;

an optical modulator that respectively modulates one ray of the input light and another ray of the input light branched by the fourth branching unit; and the integrated prism according to any one of supplementary notes 1 to 5, wherein the optical modulator outputs, to the integrated prism, light obtained by modulating the one ray of the input light as the first light, and outputs, to the integrated prism, light obtained by modulating the another ray of the input light as the second light.

(Supplementary Note 7)

The optical module according to supplementary note 6, wherein the fourth branching unit includes a semitransparent mirror that branches the input light at the predetermined ratio and generates the one ray of the input light and the another ray of the input light, and a total reflection mirror that is arranged in such a way that the another ray of the input light is output in parallel with the one ray of the input light, and the semitransparent mirror that generates the one ray and the another ray of the input light, and the total reflection mirror are formed on respectively different surfaces of a prism that form an angle of approximately 45 degrees with respect to the input light.

(Supplementary Note 8)

The optical module according to supplementary note 6 or 7, wherein the fourth branching unit, the optical modulator, and the integrated prism are arranged on a substrate that includes a positioning block, and a position of the optical modulator in a direction perpendicular to an optical axis of light incident on the optical modulator from the fourth branching unit is determined in such a way that the optical modulator makes contact with the positioning block.

(Supplementary Note 9)

The optical module according to supplementary note 6, wherein the fourth branching unit is a branching light waveguide that branches the input light at the predetermined ratio and generates the one ray of the input light and the another ray of the input light, and the fourth branching unit and the optical modulator are integrated as one body into an optical waveguide element.

(Supplementary Note 10)

The optical module according to any one of supplementary notes 6 to 9, further including a light source that generates the input light.

(Supplementary Note 11)

An optical communication device having incorporated therein the optical module according to any one of supplementary notes 6 to 10.

(Supplementary Note 12)

A method of configuring an integrated prism including:

forming, on an external surface of a prism, a polarization rotating unit that converts a polarization of input first light into third light having a polarization perpendicular to a polarization of input second light; and forming, on an internal surface of the prism, a polarization multiplexing unit that multiplexes a polarization of the second light and the third light, and outputs polarization-multiplexed light as fourth light including the second light and the third light.

In the above, the invention of the present application has been described with reference to the example embodiments. However, the invention of the present application is not limited to the above-described example embodiments. Various modifications that can be understood by those skilled in the art can be made to the configurations and details of the invention of the present application within the scope of the invention of the present application.

REFERENCE SIGNS LIST

100, 200, 300 Optical module
101 Substrate
102, 901 Light source
103, 104, 204 Integrated prism
1031 50% reflection mirror
1032, 201 100% reflection mirror
105 to 109, 304 Lens
110, 111, 303, 903, 904, 9032, 9042 Modulator
112 to 114, 921 to 923 Monitor PD
120 Positioning block
1301 First prism
1302 Second prism
141, 905 ½ wavelength plate
142 Optical delay plate
143 5% reflection mirror
144 95% reflection mirror
145, 245, 907, 9071 Polarization multiplexer
146 First emission part
147 Second emission part
148 Third emission part
149 Fourth emission part
150, 908 Optical fiber
301 Integrated light waveguide
302 Branching light waveguide
902, 911 to 913 Spectroscope
9021 50% reflection prism
9022, 9072 100% reflection prism
9031, 9033, 9041, 9043 Lens
906 Delay plate
931 to 933 5% reflection prism

The invention claimed is:

1. An integrated prism comprising:

a polarization rotator that is formed on an external surface of a prism and configured to convert a polarization of input first light into third light having a polarization perpendicular to a polarization of input second light; and a polarization multiplexer that is formed on an internal surface of the prism, configured to multiplex polarizations of the second light and the third light, and configured to output the polarization as fourth light including the second light and the third light, wherein the integrated prism includes, on an internal surface of the prism, a first branching unit, a second branching unit, and a third branching unit respectively configured to branch and output part of the second light, part of the third light, and part of the fourth light, and one ray of light branched by the first branching unit, one ray of light branched by the second branching unit, and one ray of light branched by the third branching unit are input to respectively different light-receiving elements.

2. The integrated prism according to claim 1, wherein the polarization multiplexer forms an angle of approximately 45 degrees with respect to the second light and the third light, the first branching unit is a semitransparent mirror configured to form an angle of approximately 45 degrees with respect to the second light, the second branching unit is a semitransparent mirror configured to form an angle of approximately 45 degrees with respect to the third light, the third branching unit is a semitransparent mirror configured to form an angle of approximately 45 degrees with respect to the fourth light, and the first branching unit, the second branching unit, and the third branching unit are formed on respectively different surfaces of the prism constituting the integrated prism.

3. The integrated prism according to claim 2, wherein the polarization multiplexing unit is caused to function as the third branching unit, by setting reflectance and transmissivity of the polarization multiplexing unit for each polarization to a predetermined value.

4. The integrated prism according to claim 3, wherein an optical delay unit configured to set a delay amount of the second light in such a way that a phase of the second light matches with a phase of the third light in the fourth light, is included on an external surface of the prism.

5. An optical module comprising:

a fourth branching unit configured to branch input light at a predetermined ratio;

an optical modulator respectively configured to modulate one ray of the input light and another ray of the input light, branched by the fourth branching unit; and the integrated prism according to claim 3, wherein the optical modulator outputs, to the integrated prism, light obtained by modulating the one ray of the input light as the first light, and outputs, to the integrated prism, light obtained by modulating the another ray of the input light as the second light.

6. The integrated prism according to claim 2,
wherein
an optical delay unit configured to set a delay amount of the second light in such a way that a phase of the second light matches with a phase of the third light in the fourth light, is included on an external surface of the prism.

7. An optical module comprising:
a fourth branching unit configured to branch input light at a predetermined ratio;
an optical modulator respectively configured to modulate one ray of the input light and another ray of the input light, branched by the fourth branching unit; and
the integrated prism according to claim 2,
wherein
the optical modulator outputs, to the integrated prism, light obtained by modulating the one ray of the input light as the first light, and outputs, to the integrated prism, light obtained by modulating the another ray of the input light as the second light.

8. The integrated prism according to claim 1,
wherein
an optical delay unit configured to set a delay amount of the second light in such a way that a phase of the second light matches with a phase of the third light in the fourth light, is included on an external surface of the prism.

9. An optical module comprising:
a fourth branching unit configured to branch input light at a predetermined ratio;
an optical modulator respectively configured to modulate one ray of the input light and another ray of the input light, branched by the fourth branching unit; and
the integrated prism according to claim 8,
wherein
the optical modulator outputs, to the integrated prism, light obtained by modulating the one ray of the input light as the first light, and outputs, to the integrated prism, light obtained by modulating the another ray of the input light as the second light.

10. An optical module comprising:
a fourth branching unit configured to branch input light at a predetermined ratio;
an optical modulator respectively configured to modulate one ray of the input light and another ray of the input light, branched by the fourth branching unit; and
the integrated prism according to claim 1,
wherein
the optical modulator outputs, to the integrated prism, light obtained by modulating the one ray of the input light as the first light, and outputs, to the integrated prism, light obtained by modulating the another ray of the input light as the second light.

11. The optical module according to claim 10,
wherein
the fourth branching unit includes a semitransparent mirror configured to branch the input light at the predetermined ratio and generates the one ray of the input light and the another ray of the input light, and a total reflection mirror that is arranged in such a way that the another ray of the input light is output in parallel with the one ray of the input light, and
the semitransparent mirror configured to generate the one ray and the another ray of the input light, and the total reflection mirror are formed on respectively different surfaces of a prism that form an angle of approximately 45 degrees with respect to the input light.

12. The optical module according to claim 10,
wherein
the fourth branching unit, the optical modulator, and the integrated prism are arranged on a substrate that includes a positioning block, and a position of the optical modulator in a direction perpendicular to an optical axis of light incident on the optical modulator from the fourth branching unit is determined in such a way that the optical modulator makes contact with the positioning block.

13. The optical module according to claim 10,
wherein
the fourth branching unit is a branching light waveguide configured to branch the input light at the predetermined ratio and generates the one ray of the input light and the another ray of the input light, and the fourth branching unit and the optical modulator are integrated as one body into an optical waveguide element.

14. The integrated prism according to claim 1,
wherein
an optical delay unit configured to set a delay amount of the second light in such a way that a phase of the second light matches with a phase of the third light in the fourth light, is included on an external surface of the prism.

15. An optical module comprising:
a fourth branching unit configured to branch input light at a predetermined ratio;
an optical modulator respectively configured to modulate one ray of the input light and another ray of the input light, branched by the fourth branching unit; and
the integrated prism according to claim 1,
wherein
the optical modulator outputs, to the integrated prism, light obtained by modulating the one ray of the input light as the first light, and outputs, to the integrated prism, light obtained by modulating the another ray of the input light as the second light.

16. A method of configuring an integrated prism comprising:
forming, on an external surface of a prism, a polarization rotating unit configured to convert a polarization of input first light into third light having a polarization perpendicular to a polarization of input second light; and
forming, on an internal surface of the prism, a polarization multiplexing unit configured to multiplex polarizations of the second light and the third light and outputs the polarization as fourth light including the second light and the third light,
wherein the integrated prism includes, on an internal surface of the prism, a first branching unit, a second branching unit, and a third branching unit respectively branching and outputting part of the second light, part of the third light, and part of the fourth light, and
one ray of Light branched by the first branching unit, one ray of light branched by the second branching unit, and one ray of light branched by the third branching unit are input to respectively different light-receiving elements.

* * * * *